United States Patent
Gisquet et al.

(10) Patent No.: US 10,277,894 B2
(45) Date of Patent: Apr. 30, 2019

(54) PALETTE PREDICTOR INITIALIZER WHEN ENCODING OR DECODING SELF-CONTAINED CODING STRUCTURES

(71) Applicant: CANON KABUSHIKI KAISHA, Tokyo (JP)

(72) Inventors: Christophe Gisquet, Acigne (FR); Guillaume Laroche, Saint Aubin d'Aubigne (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/546,243

(22) PCT Filed: Jan. 29, 2016

(86) PCT No.: PCT/EP2016/051974
§ 371 (c)(1),
(2) Date: Nov. 8, 2017

(87) PCT Pub. No.: WO2016/120468
PCT Pub. Date: Aug. 4, 2016

(65) Prior Publication Data
US 2018/0077411 A1    Mar. 15, 2018

(30) Foreign Application Priority Data

Jan. 29, 2015 (GB) .................................. 1501517.5
Feb. 20, 2015 (GB) .................................. 1502860.8
Jun. 8, 2015 (GB) .................................. 1509922.9

(51) Int. Cl.
*H04N 19/103*    (2014.01)
*H04N 19/196*    (2014.01)
(Continued)

(52) U.S. Cl.
CPC ........... *H04N 19/103* (2014.11); *G06T 9/004* (2013.01); *H04N 19/119* (2014.11);
(Continued)

(58) Field of Classification Search
CPC .. H04N 19/103; H04N 19/119; H04N 19/174; G06T 9/004
See application file for complete search history.

(56) References Cited

U.S. PATENT DOCUMENTS

2014/0301475 A1    10/2014    Guo et al.
2015/0010053 A1    1/2015    Xu et al.
(Continued)

FOREIGN PATENT DOCUMENTS

GB    2521410 A    6/2015
JP    2010-045589 A    2/2010
(Continued)

OTHER PUBLICATIONS

Joshi, et al., "High Efficiency Video Coding (HEVC) Screen Content Coding: Draft 3", Apr. 5, 2015, Sections 7.3.2.3.3 and 7.4.3.3.3, pp. 59, and 106-107, Available at http://phenix.int-evry.fr/jct/doc_end_user/current_document.php?id=10025.
(Continued)

*Primary Examiner* — Michael Lee
(74) *Attorney, Agent, or Firm* — Canon U.S.A., Inc. I.P. Division

(57) ABSTRACT

The invention concerns a method and a device for processing images, e.g. for encoding or decoding the images into or from a bitstream, using a palette prediction mode as defined in HEVC SCC. The images are split into hierarchical coding structures. At the decoder, the method comprises: decoding encoded data of two self-contained coding structures having the same hierarchical level, using a palette coding mode which uses, for each processed block of the two coding (Continued)

structures, an associated palette that comprises entries associating respective entry indexes with corresponding pixel values, wherein the palette associated with each processed pixel block is predicted from a palette predictor using prediction information from the bitstream; obtaining, from the bitstream, a palette predictor initializer associated with a coding structure hierarchically above the two self-contained coding structures; and initializing the palette predictor for each self-contained coding structure using the same obtained palette predictor initializer.

20 Claims, 20 Drawing Sheets

(51) Int. Cl.
*H04N 19/70* (2014.01)
*H04N 19/174* (2014.01)
*H04N 19/119* (2014.01)
*G06T 9/00* (2006.01)

(52) U.S. Cl.
CPC ......... *H04N 19/174* (2014.11); *H04N 19/197* (2014.11); *H04N 19/70* (2014.11)

(56) References Cited

U.S. PATENT DOCUMENTS

| | | |
|---|---|---|
| 2015/0016501 A1 | 1/2015 | Guo et al. |
| 2015/0341635 A1* | 11/2015 | Seregin ............... H04N 19/70 375/240.16 |
| 2017/0019677 A1* | 1/2017 | Sun .................. H04N 19/593 |
| 2017/0257630 A1* | 9/2017 | Lai .................... H04N 1/644 |
| 2017/0328302 A1* | 11/2017 | Emmerich ............. F02F 3/18 |

FOREIGN PATENT DOCUMENTS

| | | |
|---|---|---|
| RU | 2420021 C2 | 5/2011 |
| WO | 2013/159335 A1 | 10/2013 |
| WO | 2015/090217 A1 | 6/2015 |
| WO | 2015/090219 A1 | 6/2015 |

OTHER PUBLICATIONS

Misra, et al., "Modifications to palette coding for tiles/slices/dependent slices/wavefronts", 18. JCT-VC Meeting, Jun. 30, 2014-Sep. 7, 2014, Sapporo, Joint Collaborative Team on Video Coding of I SO/I EC JTC1/SC29/WG11 and ITU-T SG.16,URL:http://wftp3.itu.int/av-arch/jctvc-site/, No. JCTVC-R0233, Jun. 21, 2014, XP030116537, the whole document.
Gisquet, et al.,"AhG10: Palette predictor stuffing", 17. JCT-VC Meeting, Mar. 27, 2014-Apr. 4, 2014, Valencia, Joint Collaborative Team on Video Coding of ISO/IEC JTC1/SC29/WG11 and ITU-T SG.16, URL: http://wftp3.itu.int/av-arch/jctvc-site/, No. JCTVC-00063, Mar. 17, 2014, XP030115958, the whole document.
Gisquet, et al., "Non-CE1: On palette prediction for slices", 20. JCT-VC Meeting, Oct. 2, 2105-Feb. 18, 2015, Geneva, Joint Collaborative Team on Video Coding of ISO/IEC JTC1/SC29/WG11 and ITU-T SG.16, URL:http://wftp3.itu.int/av-arch/jctvc-site/, No. JCTVC-T0048-v4, Feb. 15, 2015, XP030117159, the whole document.
Ye, et al., "On palette predictor initialization for Screen Content Coding", 21. JCT-VC Meeting,Jun. 19, 2015-Jun. 26, 2015, Warsaw, Joint Collaborative Team on Video Coding of ISO/IEC JTC1/SC29/WG11 and ITU-T SG.16, URL:http://wftp3.itu.int/av-arch/jctvc-site/, No. JCTVC-U0084, Jun. 10, 2015, XP030117509, the whole document.
Seregin, et al., "SPS and PPS palette predictor initialization", 22. JCT-VC Meeting, Oct. 15, 2015-Oct. 21, 2015, Geneva, Joint Collaborative Team on Video Coding of ISO/IEC JTC1/SC29/WG11 and ITU-T SG.16, URL:http://wftp3.itu.int/av-arch/jctvc-site/, No. JCTVC-V0042, Oct. 6, 2015, XP030117689, the whole document.
Ye, et al., "On palette predictor initialization of Screen Content Coding", 22. JCT-VC Meeting, Oct. 15, 2015-Oct. 21, 2015; Geneva, Joint Collaborative Team on Video Coding of ISO/IEC JTC1/SC29/WG11 and ITU-T SG.16, URL:http://wftp3.itu.int/av-arch/jctvc-site/, No. JCTVC-V0068-v4, Oct. 15, 2015, XP030117725, the whole document.
Guo, et al., "CE1 D2: Adaptive initialization for CABAC with fixed probability contexts", 99. MPEG Meeting, Feb. 6, 2012-Feb. 10, 2012, San Jose, Motion Picture Expert Group or ISO/IEC JTC1/SC29/WG11, No. m23417, Jan. 31, 2012, XP030051942, the whole document.
Joshi, et al., "High Efficiency Video Coding (HEVC) Screen Content Coding: Draft 2", Joint Collaborative Team on Video Coding (JCT-VC) of ITU-T SG16 WP3 and ISO/IEC JTC1/SC29/WG11 18th Meeting, No. JCTVC-S1005, Jun. 30-Jul. 9, 2014.
Seregin, et al., "Non-SCCE3: Palette predictor resetting", Joint Collaborative Team on Video Coding (JCT-VC) of ITU-T SG16 WP3 and ISO/IEC JTC1/SC29/WG11 18th Meeting, No. JCTVC-R0229r1, Jun. 30-Jul. 9, 2014.

\* cited by examiner

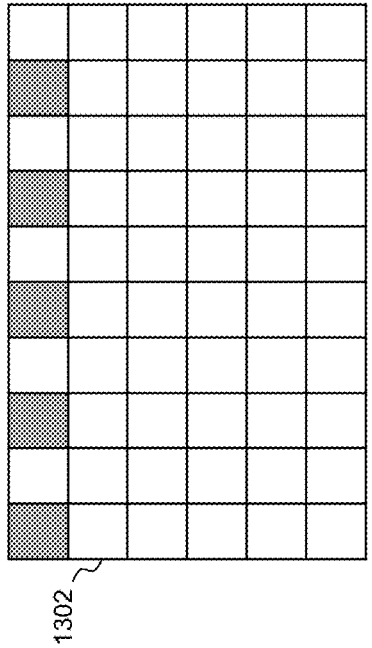
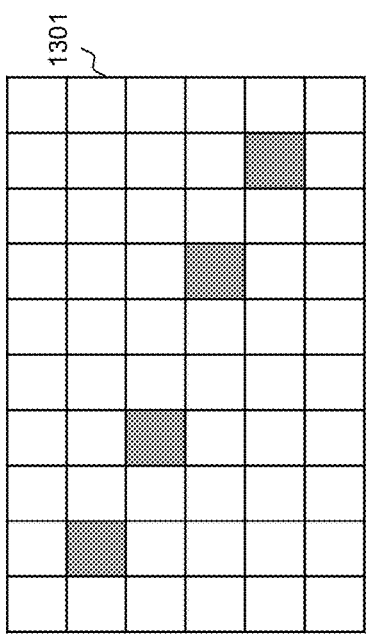
Fig. 13a
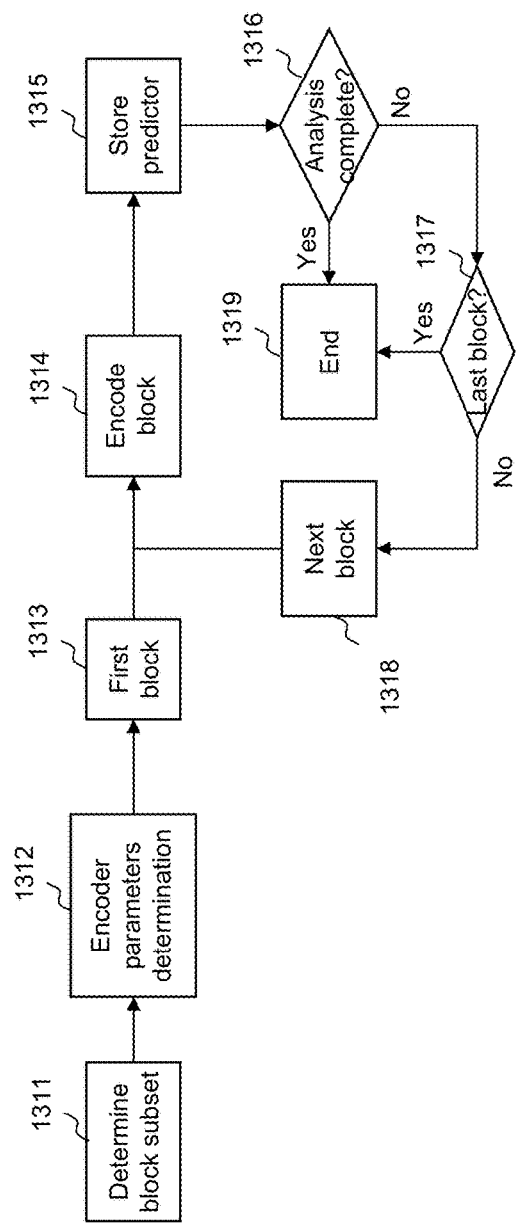
Fig. 13b

| sps_scc_extensions() { | Descriptor |
|---|---|
| intra_block_copy_enabled_flag | u(1) |
| palette_mode_enabled_flag | u(1) |
| residual_adaptive_colour_transform_enabled_flag | u(1) |
| if(palette_mode_enabled_flag) { | |
|   palette_max_size | ue(v) |
|   palette_max_predictor_size | ue(v) |
|   palette_predictor_initializer_present_flag | u(1) |
|   if(palette_predictor_initializer_present_flag) { | |
|     size_palette_predictor_initializer_minus1 | ue(v) |
|     for(i=0; i<size_palette_predictor_initializer_minus1+1; i++) { | |
|       for(comp=0; comp<num_components; comp++) { | |
|         palette_predictor_initializer[i][comp] | u(N[comp]) |
|       } | |
|     } | |
|   } | |
| } | |
| adaptive_mv_resolution_enabled_flag | u(1) |
| intra_boundary_filtering_disabled_flag | u(1) |
| } | |

Fig. 14a

| pps_scc_extensions() { | Descriptor |
|---|---|
| residual_adaptive_colour_transform_enabled_flag | u(1) |
| if(palette_mode_enabled_flag) { | |
|   palette_predictor_initializer_present_flag | u(1) |
|   if(palette_predictor_initializer_present_flag) { | |
|     size_palette_predictor_initializer_minus1 | ue(v) |
|     for(i=0; i<size_palette_predictor_initializer_minus1+1; i++) { | |
|       for(comp=0; comp<num_components; comp++) { | |
|         palette_predictor_initializer[i][comp] | u(N[comp]) |
|       } | |
|     } | |
|   } | |
| } | |
| } | |

Fig. 14b

| | Descriptor |
|---|---|
| pps_scc_extension() { | |
|   residual_adaptive_colour_transform_enabled_flag | u(1) |
|   if(palette_mode_enabled_flag) { | |
|     for(set=0; set<num_sets; set++) { | |
|       palette_predictor_initializer_present_flag[set] | u(1) |
|       if(palette_predictor_initializer_present_flag[set]) { | |
|         size_palette_predictor_initializer_minus1[set] | ue(v) |
|         for(i=; i<size_palette_predictor_initializer_minus1[set]+1; i++) { | |
|           for(comp_id=0; item<num_comps[set]; comp_id++) { | |
|             comp = comp_list[set][comp_id] | |
|             palette_predictor_initializer[i][comp] | u(N[comp]) |
|           } | |
|         } | |
|       } | |
|     } | |
|   } | |
| ... | |

Fig. 14c

| | Descriptor |
|---|---|
| pps_scc_extensions( ) { | |
|   residual_adaptive_colour_transform_enabled_flag | u(1) |
|   palette_predictor_initializer_present_flag | u(1) |
|   if( palette_predictor_initializer_present_flag ) { | |
|     monochrome_entries_flag | u(1) |
|     luma_bit_depth_entries_minus8 | ue(v) |
|     chroma_bit_depth_entries_minus8 | ue(v) |
|     palette_predictor_initializer_size_minus1 | ue(v) |
|     for( i = 0; i <= size_palette_predictor_initializer_minus1; i++ ) | |
|       for( comp = 0; comp < monochrome_entries_flag == 0 ? 1 : 3; comp++ ) | |
|         palette_predictor_initializer[ i ][ comp ] | u(v) |
|   } | |
| } | |

Fig. 14d

| | Descriptor |
|---|---|
| pps_scc_extension( ) { | |
|   residual_adaptive_colour_transform_enabled_flag | u(1) |
|   if( residual_adaptive_colour_transform_enabled_flag ) { | |
|     pps_slice_act_qp_offsets_present_flag | u(1) |
|     pps_act_y_qp_offset_plus5 | se(v) |
|     pps_act_cb_qp_offset_plus5 | se(v) |
|     pps_act_cr_qp_offset_plus3 | se(v) |
|   } | |
|   palette_predictor_initializer_present_flag | u(1) |
|   if( palette_predictor_initializer_present_flag ) { | |
|     monochrome_palette_flag | u(1) |
|     luma_bit_depth_entry_minus8 | ue(v) |
|     if( !monochrome_palette_flag ) | |
|       chroma_bit_depth_entry_minus8 | ue(v) |
|     num_palette_predictor_initializer_minus1 | ue(v) |
|     numComps = monochrome_palette_flag ? 1 : 3 | |
|     for( i = 0; i <= num_palette_predictor_initializer_minus1; i++ ) | |
|       for( comp = 0; comp < numComps; comp++ ) | |
|         palette_predictor_initializers[ i ][ comp ] | u(v) |
|   } | |
| } | |

Fig. 15

| | Descriptor |
|---|---|
| pps_scc_extension( ) { | |
|   monochrome_flag | u(1) |
|   if( !monochrome_flag ) | |
|     residual_adaptive_colour_transform_enabled_flag | u(1) |
|   if( residual_adaptive_colour_transform_enabled_flag ) { | |
|     pps_slice_act_qp_offsets_present_flag | u(1) |
|     pps_act_y_qp_offset_plus5 | se(v) |
|     pps_act_cb_qp_offset_plus5 | se(v) |
|     pps_act_cr_qp_offset_plus3 | se(v) |
|   } | |
|   palette_predictor_initializer_present_flag | u(1) |
|   if( palette_predictor_initializer_present_flag ) { | |
|     luma_bit_depth_entry_minus8 | ue(v) |
|     if( !monochrome_flag ) | |
|       chroma_bit_depth_entry_minus8 | ue(v) |
|     num_palette_predictor_initializer_minus1 | ue(v) |
|     numComps = monochrome_flag ? 1 : 3 | |
|     for( i = 0; i <= num_palette_predictor_initializer_minus1; i++ ) | |
|       for( comp = 0; comp < numComps; comp++ ) | |
|         palette_predictor_initializers[ i ][ comp ] | u(v) |
|   } | |
| } | |

Fig. 16

| | Descriptor |
|---|---|
| pps_scc_extension( ) { | |
|   residual_adaptive_colour_transform_enabled_flag | u(1) |
|   if( residual_adaptive_colour_transform_enabled_flag ) { | |
|     pps_slice_act_qp_offsets_present_flag | u(1) |
|     pps_act_y_qp_offset_plus5 | se(v) |
|     pps_act_cb_qp_offset_plus5 | se(v) |
|     pps_act_cr_qp_offset_plus3 | se(v) |
|   } | |
|   palette_predictor_initializer_present_flag | u(1) |
|   if( palette_predictor_initializer_present_flag ) { | |
|     if( !residual_adaptive_colour_transform_enabled_flag ) | |
|       monochrome_palette_flag | u(1) |
|     luma_bit_depth_entry_minus8 | ue(v) |
|     if( !monochrome_palette_flag ) | |
|       chroma_bit_depth_entry_minus8 | ue(v) |
|     num_palette_predictor_initializer_minus1 | ue(v) |
|     numComps = monochrome_palette_flag ? 1 : 3 | |
|     for( i = 0; i <= num_palette_predictor_initializer_minus1; i++ ) | |
|       for( comp = 0; comp < numComps; comp++ ) | |
|         palette_predictor_initializers[ i ][ comp ] | u(v) |
|   } | |
| } | |

Fig. 17

PALETTE PREDICTOR INITIALIZER WHEN ENCODING OR DECODING SELF-CONTAINED CODING STRUCTURES

CROSS REFERENCE TO RELATED APPLICATIONS

The application is the National Phase application of PCT Application No. PCT/EP2016/051974, filed on Jan. 29, 2016 and titled "PALETTE PREDICTOR INITIALIZER WHEN ENCODING OR DECODING SELF-CONTAINED CODING STRUCTURES." This application claims the benefit under 35 U.S.C. § 119(a)-(d) of United Kingdom Patent Applications numbered: GB1501517.5 filed on Jan. 29, 2015 and titled "PALETTE PREDICTOR INITIALIZER WHEN ENCODING OR DECODING SELF-CONTAINED CODING STRUCTURES," GB1502860.8 filed on Feb. 20, 2015 and titled "PALETTE PREDICTOR INITIALIZER WHEN ENCODING OR DECODING SELF-CONTAINED CODING STRUCTURES," and GB1509922.9 filed on Jun. 8, 2015 and titled "DECODING METHOD AND CORRESPONDING DEVICE." The above cited patent applications are incorporated herein by reference in their entirety.

FIELD OF THE INVENTION

The present invention concerns a method and a device for processing at least one image, e.g. for encoding or decoding the images into or from a bitstream, using a palette prediction mode. It particularly concerns the palette mode encoding as introduced in HEVC Screen Content Coding (SCC) Extension.

BACKGROUND OF THE INVENTION

It applies more particularly to a mode of coding where blocks of pixels are each encoded based on a respective block of indexes encoded with or built from a so-called palette.

A palette in this document is defined as a look up table having entries, or "elements", associating an index with a value of a pixel. Generally each entry comprises one or three elements as mentioned later. Each element concerns the pixel value for a color component. For example, if the image is monochrome each entry of the palette comprises one element for the unique color component.

In other words, typically, but not necessarily, the value of a pixel is constituted by the value of each colour component associated with the pixel, resulting in a colour palette. However, the value of a pixel may be made of a single pixel component (named "element"), resulting in a monochrome palette.

This mode of encoding a block of pixel is generally referred to as Palette coding mode. It is contemplated to adopt this mode, for example, in the Screen Content Coding (SCC) Extension of the High Efficiency Video Coding international standard (see document JCTVC-S1005).

When encoding an image in a video sequence, the image is first divided into coding entities (also known as "coding structures") of pixels of equal size referred to as Coding Tree Blocks (CTBs). The CTBs may be grouped into other coding structures having a higher hierarchical level, such as slices and/or tiles. In other words, the image is recursively divided into hierarchical coding structures or coding entities.

The size of a Coding Tree Block is typically 64 by 64 pixels. Each Coding Tree Block may then be broken down into a hierarchical tree of smaller blocks whose size may vary and which are the actual blocks of pixels to encode. These smaller blocks to encode are referred to as Coding Units (CUs).

The encoding of a particular Coding Unit involves competition between predictive coding modes, including the well-known INTRA coding mode, the well-known INTER coding mode, and the Palette coding mode.

With the Palette coding mode, it is possible to define a representative block for a given Coding Unit as a block of indexes from a palette: for each pixel location in the Coding Unit, the said representative block contains the index associated with a pixel value in the Palette which is the closest to the value of the pixel having the same location (i.e. collocated) in the coding unit. However, this palette-based algorithm of selecting the closest palette entry is encoder-only in HEVC SCC: there is no need to know said algorithm in order to parse or decode a bitstream. Typically, closest means with the lowest distance using a particular metric distance such as the sum of absolute, or the square of, differences of component values. In particular, in case of lossless coding, this means the palette entry should be selected as equal to the pixel by the encoder. In the following, "correspond to" or "match" is used to mean either "is equal" when in lossless coding, or "is the closest" otherwise.

In the recent version of HEVC SCC, no residual between the original pixel block and the corresponding palette-based representative pixel block is provided. To avoid high quality decreasing in the encoded image, an "escape-coded" feature has been introduced to encode the pixels, the values of which do not match a pixel value of an entry of the Palette. This means, in lossless coding, that no palette entry is equal to the pixel value. In such case, a specific index in the Palette is used to signal an "escape-coded" pixel; and the quantized value itself of the escape-coded pixel is directly encoded in the bitstream, the quantization depending on a quantizer step transmitted at the CU-level. In case of lossless coding, the quantizer step is 0, meaning no quantization. The quantization is what is defined in the HEVC standard as the transform-bypass quantization, and the quantized values are encoded using truncated binary codes.

The Palette coding mode thus uses a current palette to build a block of indexes representative of a current coding unit or block of pixels. Entry indexes in the Palette are also known as "levels".

When using the Palette mode, the palette and the block of indexes or "levels" is often transmitted in the bitstream encoding the image. This represents a high cost of signalling because a palette, which may comprise tens of entries, needs to be transmitted for each Coding Unit.

In Applicant's contribution in JCT-VC (No. JCTVC-Q0063 entitled "*AhG10: palette predictor stuffing*", 17th Meeting: Valencia, ES, 27 Mar.-4 Apr. 2014), it has been proposed to predict the current Palette for a current Coding Unit using a palette predictor, for instance the last Palette used (for the last processed Coding Unit). This approach aims at reducing the coding costs, since a palette is no longer fully explicitly transmitted for each Coding Unit.

In addition, another proposed prediction mechanism relies on reusing the full previous palette as it is, such reuse being indicated by a flag palette_share_flag and requiring that the decoder stores the size of said palette. However, storing that palette is un-needed as it is at the start of the predictor.

However, some coding specificities may break the palette prediction scheme throughout the Coding Units of the image. This is the case of coding structures like Slices and Tiles.

The Slice and Tile coding structures have been introduced in HEVC to provide re-synchronization in case of data loss in the sequence of images (video). Note that an independent tile as defined in the HEVC standard comprises at least one slice and is spatially independent from the other tiles.

To obtain the re-synchronization property, the slices and tiles are encoded/decoded independently of each other. In other words, they are "self-contained", meaning for instance that no INTRA prediction is performed at the boundaries of the slice or tile, and no entropy coding state or palette predictor or area for IBC (Intra Block Copy) prediction is shared with (or inherited from) a previously processed slice or tile.

The re-synchronization property thus makes data useful to prediction no longer unavailable, therefore reducing coding efficiency. In Applicant's contribution JCTVC-Q0063, the palette predictor is reset to zero when starting coding a new independent slice or tile, or even when starting coding a new line of CTBs (known as Wavefront coding) or a new image or frame. Another approach in Applicant's contribution JCTVC-Q0063 consists in resetting a set of palettes from which the palette predictor is selected, to a by-default palette which is locally (at the decoder) determined. For instance, the by-default palette is made of pixel values equally distributed over a colour space.

This approach is clearly not satisfactory, in particular with SCC where there is a high level of information redundancy within one and the same image.

Further, some coding specificities may break the palette prediction scheme throughout the Coding Units of the image. This is the case of coding structures like Slices and Tiles. As a consequence, in the contribution JCTVC-T1005 entitled "*HEVC Screen Content Coding Draft Text 3*", 21$^{st}$ Meeting: Geneva, CH, 19-26 Feb. 2015, it has been proposed to transmit a palette predictor initializer in the Picture Parameter Set extension for the HEVC SCC Extension. According to a particular embodiment, when the entries of that initializer are monochrome, the monochrome context and/or the bitdepths of the entries components are signalled.

However signalling the colour format introduces either redundancies or potentially some incompatibilities in parameter values.

SUMMARY OF THE INVENTION

The present invention has been devised to overcome all or part of the foregoing drawbacks. In particular, it seeks to improve encoding efficiency using the Palette mode, for instance to substantially decrease the signalling costs when using coding structures such as the slices or tiles.

In a first aspect, the present invention provides a method of decoding at least one image from a bitstream, the image being split into hierarchical coding structures including a plurality of slices, said slices each having a same hierarchical level in the image, the method comprising the following steps:

decoding encoded data of two slices, using a palette coding mode, the palette coding mode using, for each of processed pixel blocks of the two slices, an associated palette that comprises a set of entries associating respective entry indexes with corresponding pixel values, wherein the palette associated with each processed pixel block is predicted from a palette predictor using prediction information from the bitstream;

obtaining, from the bitstream, a palette predictor initializer associated with a coding structure hierarchically above the slices; and initializing the palette predictor for each of the two slices using the obtained palette predictor initializer, wherein each palette predictor subsequent to the initialized palette predictor includes all the entries of a current palette associated with a block currently being decoded and one or more entries of the palette predictor used for predicting the current palette which are not used to predict the current palette.

In a second aspect the present invention provides a method of encoding at least one image into a bitstream, comprising the following steps:

obtaining hierarchical coding structures by splitting the image;

encoding data of two coding structures of the image independently of each other to obtain two encoded slices having a same hierarchical level in the image, wherein said encoding uses a palette coding mode, the palette coding mode using, for each of block of pixels of the two slices, an associated palette that comprises a set of entries associating respective entry indexes with corresponding pixel values, wherein the encoding step includes determining prediction information predicting the palette associated with each processed pixel block from a palette predictor;

determining a palette predictor initializer to initialize the palette predictor for the two slices; and in the bitstream, providing the encoded data including the prediction information and providing the palette predictor initializer, wherein the palette predictor initializer is associated with a coding structure hierarchically above the two slices in the bitstream, and wherein, in the palette coding mode, each palette predictor subsequent to the initialized palette predictor includes all the entries of a current palette associated with a block currently being encoded and entries of the palette predictor for predicting the current palette which are not used to predict the current palette.

In an embodiment, the palette predictor initializer is defined at the image level in a Picture Parameter Set, PPS; and the two slices make reference to the Picture Parameter Set.

In an embodiment, the palette predictor initializer is defined at a sequence level in a Sequence Parameter Set, SPS; and the two self-contained coding structures make reference to the Sequence Parameter Set.

In an embodiment, the palette predictor initializer is defined after a first field indicating whether the palette coding mode is activated or not and after a second field comprising a maximum size for the palette predictor, in the Sequence Parameter Set.

In an embodiment, the palette predictor initializer is defined at a tile level in a tile comprising the two slices; and each of the two slices identify the tile to which it belongs.

In an embodiment, the initializing step for both of the two slices is performed before decoding the very first block of pixels in the respective slice.

In an embodiment, the prediction information to predict the palette from the palette predictor includes a bitmap of flags, each flag of which defining whether or not a corresponding entry in the palette predictor is selected as an entry to generate an entry in the palette.

In an embodiment of the second aspect, determining the predictor initializer comprises encoding, using the palette coding mode, a subset of blocks of pixels spread over an image area defined by said coding structure hierarchically above the two slices, and comprises using a palette predictor obtained at the end of the encoding step, as the palette predictor initializer.

The blocks of pixels of the subset may be distributed along a slope or a diagonal of the area.

The blocks of pixels of the subset may be horizontally aligned on the top of the image.

The blocks of pixels of the subset may be not contiguous.

In an embodiment, determining a palette predictor initializer comprises recursively encoding the same subset of block of pixels, wherein the first palette predictor used for the next recursive encoding loop is the palette predictor obtained at the end of the previous recursive encoding loop.

In an embodiment, the slices are included in two separate images.

In an embodiment, the slices are included in the same image.

In an embodiment, a size of the palette is set using a size of the palette predictor initializer used to initialize the palette predictor.

In an embodiment the method further comprises obtaining information about the number of color components, the structure of the palette predictor initializer being based on said information about the number of color components. For example, the information may be a flag for signalling whether said image is a monochrome image or not.

In a third aspect of the present invention there is provided a decoding device for decoding at least one image from a bitstream, the image being split into hierarchical coding structures including a plurality of slices, said slices each having a same hierarchical level in the image;

decoding means for decoding encoded data of two slices, using a palette coding mode, the palette coding mode using, for each of processed pixel blocks of the two slices, an associated palette that comprises a set of entries associating respective entry indexes with corresponding pixel values, wherein the palette associated with each processed pixel block is predicted from a palette predictor using prediction information from the bitstream;

obtaining means for obtaining, from the bitstream, a palette predictor initializer associated with a coding structure hierarchically above the two slices; and initializing means for initializing the palette predictor for each of the two slices using the obtained palette predictor initializer, wherein, in the palette coding mode, each palette predictor subsequent to the initialized palette predictor includes all the entries of a current palette associated with a block currently being decoded and one or more entries of the palette predictor for predicting the current palette which are not used to predict the current palette.

In a fourth aspect of the present invention there is provide a device for encoding at least one image into a bitstream, the encoding device comprising:

obtaining means for obtaining hierarchical coding structures by splitting the image;

encoding data of two coding structures of the image independently of each other to obtain two slices having a same hierarchical level in the image, wherein said encoding uses a palette coding mode, the palette coding mode using, for each block of pixels of the two slices, an associated palette that comprises a set of entries associating respective entry indexes with corresponding pixel values, wherein the encoding step includes determining prediction information predicting the palette associated with each processed pixel block from a palette predictor;

determining a palette predictor initializer to initialize the palette predictor for the two slices; and in the bitstream, providing the encoded data including the prediction information and providing the palette predictor initializer, wherein the palette predictor initializer is associated with a coding structure hierarchically above the two slices in the bitstream, and wherein, in the palette coding mode, each palette predictor subsequent to the initialized palette predictor includes all the entries of a current palette associated with a block currently being encoded and entries of the palette predictor for predicting the current palette which are not used to predict the current palette.

In a fifth aspect of the present invention there is provided a computer program which, when executed causes the method of any of the preceding statements to be performed.

The present invention, in a further aspect provides a method of decoding at least one image from a bitstream, the image being split into hierarchical coding structures, the method comprising the following steps:

decoding encoded data of two self-contained coding structures (i.e. coding structures encoded independently of other coding structures of the same hierarchical level) having the same hierarchical level in the image, using a palette coding mode, the palette coding mode using, for each of processed pixel blocks of the two coding structures, an associated palette that comprises a set of entries associating respective entry indexes with corresponding pixel values, wherein the palette associated with each processed pixel block is predicted from a palette predictor using prediction information from the bitstream;

obtaining, from the bitstream, a palette predictor initializer associated with a coding structure hierarchically above the two self-contained coding structures; and initializing the palette predictor for each of the two self-contained coding structures using the same obtained palette predictor initializer.

In a symmetric fashion, the present invention also provides a method of encoding at least one image into a bitstream, comprising the following steps:

obtaining hierarchical coding structures splitting the image;

encoding data of two coding structures of the image independently of each other coding structure having the same hierarchical level in the image to obtain two self-contained encoded coding structures, said encoding using a palette coding mode, the palette coding mode using, for each of processed pixel blocks of the two coding structures, an associated palette that comprises a set of entries associating respective entry indexes with corresponding pixel values, wherein the encoding step includes determining prediction information predicting the palette associated with each processed pixel block from a palette predictor;

determining a single palette predictor initializer to initialize the palette predictor for the two self-contained coding structures; and in the bitstream, providing the encoded data including the prediction information and providing the palette predictor initializer, wherein the palette predictor initializer is associated with a coding structure hierarchically above the two self-contained coding structures in the bitstream.

Correlatively, the invention provides a decoding device for decoding at least one image from a bitstream, the image being split into hierarchical coding structures, the decoding device comprising at least one microprocessor configured for carrying out the steps of the above decoding method. The invention also provides an encoding device for encoding at least one image into a bitstream, the encoding device comprising at least one microprocessor configured for carrying out the steps of the above encoding method.

Thanks to the invention, coding efficiency is improved. This is mainly achieved by using a palette predictor initializer defined at a hierarchical level strictly higher than the one of the coding structures that need initializing their palette predictor. This is because the same palette predictor initializer can be used by several independent coding structures (e.g. slices), at low costs (i.e. without being sent several times in the bitstream).

Optional features of embodiments of the invention are defined in the appended claims. Some of these features are explained here below with reference to a method, while they can be transposed into system features dedicated to a device according to embodiments of the invention.

In embodiments, the palette predictor initializer is defined at the image level in a Picture Parameter Set, PPS; and the two self-contained coding structures refer to the Picture Parameter Set. This provision is fully compatible with some optimizations at the encoder's end, such as updating the palette predictor initializer after a certain amount of frames or time, or using a palette predictor initializer per sub-area of an image (e.g. tile or arbitrary sub-area).

In a variant, the palette predictor initializer is defined at a sequence level in a Sequence Parameter Set, SPS; and the two self-contained coding structures refer to the Sequence Parameter Set. As for the PPS approach above, this variant does not require additional data at the self-contained coding structure (e.g. slice) level. This is because a reference to an SPS (or PPS) already exists in the signalling of the self-contained coding structures (e.g. slices). Coding efficiency is thus highly improved.

According to a specific feature, the palette predictor initializer is defined after a first field indicating whether the palette coding mode is activated or not and after a second field comprising a maximum size for the palette predictor, in the Sequence Parameter Set. This provision optimizes processing costs, since for instance no palette predictor initializer determination has to be performed if the first field indicates that the palette coding mode is not activated.

In another variant, wherein the two self-contained coding structures are slices; and the palette predictor initializer is defined at a tile level in the tile comprising the two self-contained coding structures; and each of the two self-contained coding structures identify the tile to which it belongs. Compared to the definition of the initializer in the PPS, this provision makes it possible to limit the increase of the PPS ID. This is because there is no longer the need to provide a new PPS ID for each new palette predictor initializer declared. To be noted that a list of initializers may be defined within a PPS, wherein each initializer is associated with a specific tile.

Regarding the decoding, embodiments may provide that the initializing step for any of the two self-contained coding structures is performed before decoding the very first block of pixels in the self-contained coding structure considered. This is because, because of the "self-contained" property, the coding/decoding of the very first block cannot inherit of data (including the palette predictor) from a previous pixel block or coding structure.

In some embodiments, a next palette predictor for a next block of pixels in one of the two self-contained coding structures is built from a current palette used to encode a current block of pixels in the same self-contained coding structure. In that case, it is advantageous to initialize said palette predictor rather than to extend it, as, in the latter case, the extended palette predictor may end up later having duplicated values.

Note that the pixel blocks are usually successively considered according to a scanning order, for instance a raster scan, within the coding structure considered. The next palette predictor is for instance used to evaluate the palette coding mode during the competition with the other coding modes (INTRA, INTER, etc). In case the palette coding mode is not selected for the next pixel block, the "next palette predictor" can be used for the further next pixel block.

The above provision shows that the palette predictor is bound to dynamically evolve as the pixel blocks within the coding structure (e.g. slice) are coded.

In a particular embodiment, the next palette predictor is built from only the current palette and a current palette predictor used to predict the current palette.

In particular, the next palette predictor may be built by selecting all the entries of the current palette and selecting the entries of the current palette predictor that have not been used to predict the current palette. This approach incrementally supplements the palette predictors used in the self-contained coding structure with new colors that may be added to the current palettes while encoding the pixel blocks. As a result, the palette coding mode becomes more and more efficient as the pixel blocks are traversed.

In embodiments, the prediction information to predict the palette from the palette predictor includes a bitmap of flags (usually decoded from the bitstream at the decoder's end, and added into the bitstream at the encoder's end), each flag of which defining whether or not a corresponding entry in the palette predictor is selected as an entry to generate an entry in the palette.

In specific embodiments, the bitmap of flags (usually encoded using RLE—run-length encoding) comprises the same number of bits as the number of entries in the palette predictor, and each bit at a position in the bitmap defines whether or not the entry having the corresponding position in the palette predictor is selected as an entry of the palette. This configuration improves the coding efficiency. A variant that may further reduce the size of the bitmap may consider stopping the bitmap at the last entry that is selected as an entry of the palette. This is particularly advantageous since, as suggested above, the entries in the palette predictor are ordered according to their occurrences. In some embodiments, this results in the last entries of the palette predictor being statistically not often used for the palette.

In other specific embodiments, the method may further comprise adding additional entries at the end of the palette having the selected entries from the palette predictor. These additional entries may be entries for additional pixels decoded (at both the decoder and the encoder using a decoding loop) and/or entries from a predetermined palette that is for example built by the encoder and transmitted (in the bitstream) to the decoder (as in the conventional Palette coding mode). This provision is to increase the coding efficiency of the palette.

In a variant to transmit a bitmap of flags, an implicit approach may be used, thus reducing additional data or bits (the bitmap) to be sent in the bitstream: it is possible to indicate through a flag (palette_share_flag) that the next pixel block or CU to be palette-coded will reuse all the entries of the last palette used for the last palette-coded pixel block or CU. In that case, a specific embodiment may consist in initializing, using the palette predictor initializer size, the size of the palettes that are to be used for encoding the pixel blocks.

In some embodiments, the pixel values of the entries of the current palette have colour components, and only a subpart of the colour components are predicted using the palette predictor. In practice, one or two colour components out of three may be predicted. This provision reduces processing and signalling in the bitstream.

Regarding the encoding, embodiments may provide that determining a single palette predictor comprises encoding, using the palette coding mode, a subset of blocks of pixels spread over an image area made of said coding structure hierarchically above the two self-contained coding structures, and comprises using a palette predictor obtained at the end of the encoding step, as the palette predictor initializer.

Restricting the determining step to a subset of pixels makes it possible to have low complexity process in determining an initializer. This is particularly suitable for low delay encoding.

To be noted that the palette coding mode is preferably competing with other coding modes (e.g. INTRA and INTER) so that the blocks which are not adapted for palette coding are withdrawn (because encoded using another coding mode) from consideration. Also, the encoding of the determining step does not result in generating data for the bitstream, but only constitutes an analysis of the subset of pixels based on palette encoding.

In some embodiments, the pixel blocks of the subset are distributed along a slope or a diagonal of the area. This is to have a subset of pixel blocks that is representative as much as possible of the whole image area for which the palette predictor initializer will be used.

In a variant, the pixel blocks of the subset are horizontally aligned on the top of the image area, preferably on the top of the image. The palette predictor initializer thus obtained is well suited for the encoding of the start of the image, and can be used for several successive images.

In a specific embodiment, the pixel blocks of the subset are not contiguous. For instance, each two (or more) pixel blocks, one pixel block may be selected. This is to avoid useless processing that may result from processing very similar contiguous pixel blocks.

In other embodiments, determining a single palette predictor comprises recursively encoding the same subset of block of pixels, wherein the first palette predictor used for the next recursive encoding loop is the palette predictor obtained at the end of the previous recursive encoding loop. In other words, the palette predictor obtained at the end of the previous recursive encoding loop is used as a palette predictor initializer for the next encoding loop. As the number of recursive loops increases, the palette predictor initializer becomes more and more relevant for encoding the pixel blocks of the self-contained coding unit. As a consequence, more pixel blocks are palette encoded and less pixel blocks are INTER or INTRA coded, thus improving the encoding rate.

In some embodiments, the two self-contained coding structures are included in two separate images. In a variant, the two self-contained coding structures are included in the same image.

In some embodiments that may relate to the reuse or sharing of a palette between successive palette-coded pixel blocks, the method may further comprise defining the size of the current palette. For instance, a size of the palette may be set using a size of the palette predictor initializer used to initialize the palette predictor. This mainly occurs for the first palette-coded in the self-contained coding structure, since no palette is inherit from previous pixel blocks. In some embodiments that may relate to the sharing of a palette between successive palette-coded pixel blocks, the method may further comprise initializing the size of said shared palette, when no previous palette actually exists. According to an embodiment of the invention, this size may be initialized using the size of the palette predictor initializer if this one is inferior to a maximum size allowed for the palettes.

In an embodiment information about the number of color components is obtained, the palette predictor initializer structure being based on said information.

In other words, the palette predictor initializer may comprise as many components as color components, the number of palette predictor initializer components being obtained from said information.

Preferably said information is a flag for signalling whether said image is a monochrome image or not.

Another aspect of the invention relates to a non-transitory computer-readable medium storing a program which, when executed by a microprocessor or computer system in a device for decoding or encoding at least one image, causes the device to perform the decoding or encoding method as defined above.

The non-transitory computer-readable medium may have features and advantages that are analogous to those set out above and below in relation to the methods and devices.

Another aspect of the invention relates to a method of decoding at least one images from a bitstream, the image being split into hierarchical coding structures, substantially as herein described with reference to, and as shown in, FIG. 12*a*, or FIG. 12*b*, or FIGS. 12*a*-12*b* and (14*a* or 14*b* or 14*c* or 14*d*) of the accompanying drawings.

Yet another aspect of the invention relates to a method of encoding at least one image into a bitstream, substantially as herein described with reference to, and as shown in, FIG. 13*b*, or FIGS. 13*a* and 13*b*, or FIGS. 13*a* and (14*a* or 14*b* or 14*c* or 14*d*) of the accompanying drawings.

Another aspect of the invention relates to a method of decoding a picture parameter set used for decoding images from a bitstream, the image comprising pixels having at least one color-component, the method being broken down into several steps. The method comprises:

decoding one color-component parameter defined in the picture parameter set and involved in at least two steps of the decoding method, indicating if said image is monochrome, and;

skipping or amending at least one step of the decoding method if the decoded color-component parameter indicates that the image is monochrome.

This aspect of the invention aims at proposing a syntax without any redundancy which used to be source of faults. This aspect of the invention is more efficient and prevents contradictory configurations.

In an embodiment at least two different steps are either skipped or amended, at least one of the steps comprising decoding pixel values having been encoded using a palette mode.

In an embodiment, one step comprises determining the number of elements for at least one entry or each entry of a palette predictor initializer. As defined above each element concerns the pixel value for a color component. For example, if the image is monochrome each entry of the palette comprises one element for the unique color component In an embodiment, each entry of a palette predictor initializer is a singleton if the decoded color-component parameter is set to a predetermined value, else a triplet.

In an embodiment, one of the steps is related to the residual adaptive colour transform, which is skipped if the color-component parameter indicates that the image is monochrome.

In an embodiment, the parameter is a flag taking the value "1" when the image is monochrome.

Another aspect of the invention relates to a method of decoding a picture parameter set used for decoding images from a bitstream, the image comprising pixels having at least one color-component, said image being encoded by using one mode among a plurality of modes including the palette mode. The method comprises:

A step related to the residual adaptive colour transform; and

A step for defining a palette predictor initializer, the defining step being processed based on the value of a color-component parameter indicating if the image is monochrome or not.

The value of the color-component parameter is inferred from the execution of the residual adaptive colour transform.

This other aspect of the invention aims at proposing a syntax without any redundancy which used to be source of faults. This aspect of the invention is more efficient and prevents contradictory configurations.

In an embodiment, if the residual adaptive colour transform is executed, the value of the color-component parameter is inferred to indicate that the image is not monochrome.

In an embodiment, the color-component parameter is a flag whose value is inferred to be "0" if the residual adaptive colour transform is executed.

Another aspect of the invention relates to a method of decoding a picture parameter set used for decoding images from a bitstream, the image comprising pixels having at least one color-component, at least one image being encoded by using the palette mode, the method comprising a step for initializing a palette predictor with a palette predictor initializer having the same number of entries, the palette predictor initializer and the palette predictor having one or more elements per entry.

The initialization of the palette predictor by the palette predictor initializer is governed by predetermined rules when switching from an image having pixels with a given number of color-components to an image having another number color-components.

In an embodiment, a predetermined rule comprises for at least one entry of the palette predictor, setting at least two of the elements to the same element's value of the palette predictor initializer.

In an embodiment, a predetermined rule comprises for at least one entry of the palette predictor, setting at least one of the elements to a predetermined default value.

In an embodiment, the predetermined rule is applied when switching from an image having one color-component to an image having three color-components.

According to another aspect of the invention it is proposed a decoding device for decoding a picture parameter set related to an image from a bitstream, said device being configured to implement a decoding method according to one of the embodiments described above.

According to another aspect of the invention it is proposed a non-transitory computer-readable medium storing a program which, when executed by a microprocessor or computer system in a device for decoding at least one image, causes the device to perform the method according to one of the embodiments described above. At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal. In other words, the carrier medium may be transitory or non-transitory.

BRIEF DESCRIPTION OF THE DRAWINGS

Embodiments of the invention will now be described, by way of example only, and with reference to the following drawings in which:

FIG. 13a illustrates various subsets of blocks for use in an encoder determination of the palette predictor initializer;

FIG. 13b illustrates an analysis performed by the encoder on a subset of blocks for determining the palette predictor initializer;

FIGS. 14a, 14b, 14c and 14d illustrate examples of signalling the palette prediction initializer in existing SPS or PPS SCC extensions, as written by the encoder and parsed by the decoder;

FIG. 15 illustrates an example of signalling the palette prediction initializer, as proposed in the JCTVC-T1005 document, in the PPS SCC extension, as written by the encoder and parsed by the decoder;

FIG. 16 illustrates an embodiment of a further aspect of the invention;

FIG. 17 illustrates another embodiment of the further aspect invention;

and

Figure 18:
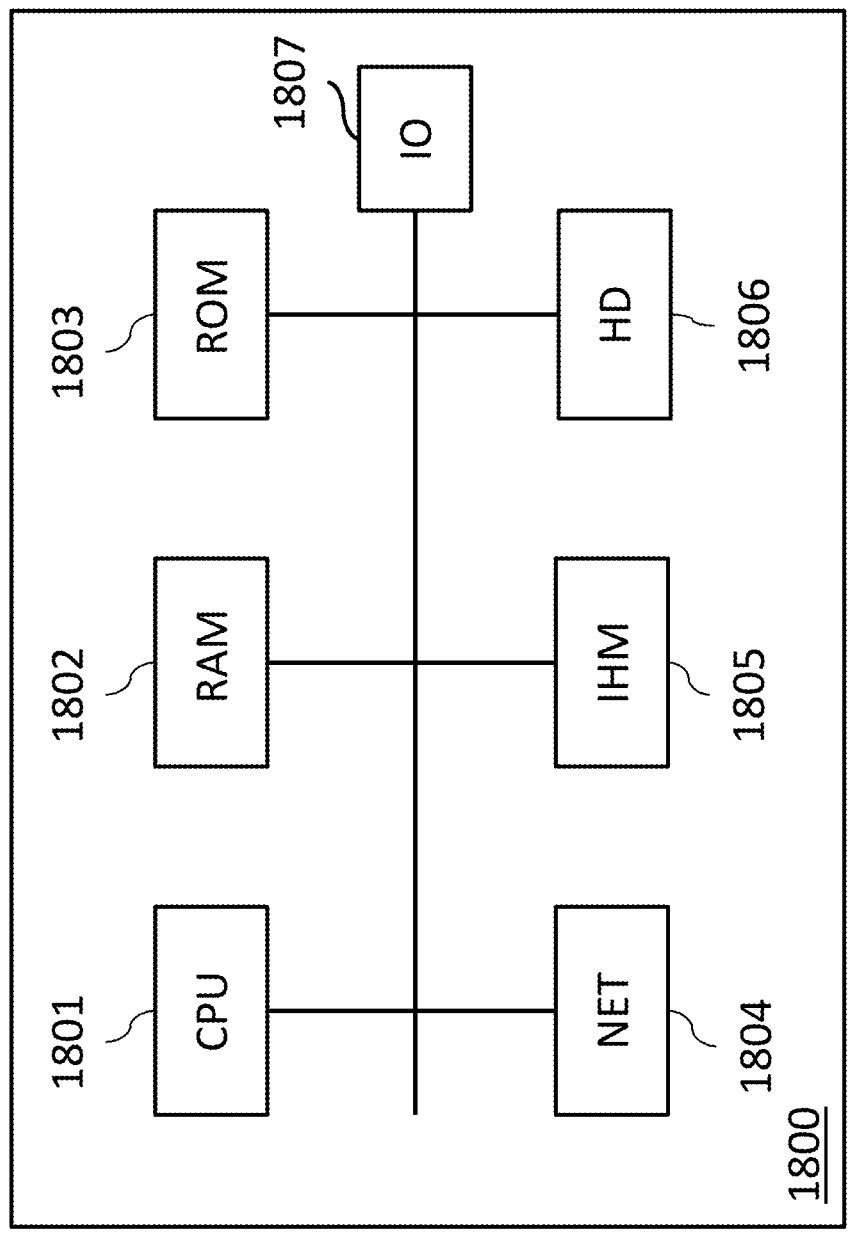

FIG. 18 is a schematic block diagram of a computing device for implementation of one or more embodiments of the invention.

DETAILED DESCRIPTION OF EMBODIMENTS OF THE INVENTION

Figure 1:
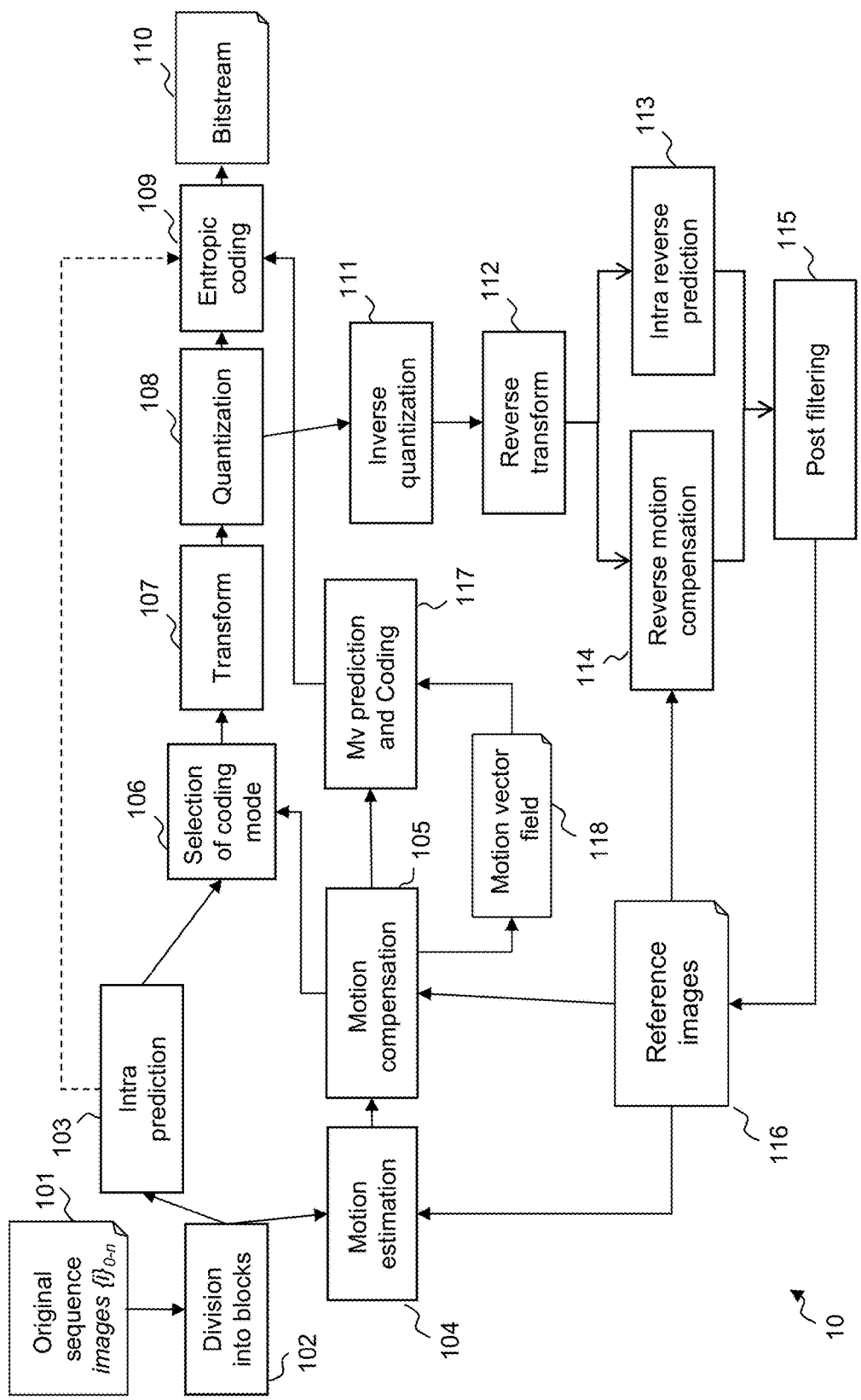
FIG. 1 illustrates the HEVC encoder architecture.

FIG. 1 illustrates the HEVC encoder architecture. In the video encoder, an original sequence 101 is divided into blocks of pixels 102. A coding mode is then assigned to each block. There are two families of coding modes typically used in HEVC: the modes based on spatial prediction or INTRA modes 103 and the modes based on temporal prediction or INTER modes based on motion estimation 104 and motion compensation 105. An extension of HEVC being currently designed, known as HEVC SCC, adds additional coding modes, in particular the Palette coding mode, which competes with INTRA and INTER coding modes to encode blocks of pixels. This Palette coding mode is described in more details below, in particular with reference to FIGS. 5 to 9. One skilled in the art may also obtain details about the Palette coding mode in document JCTVC-S1005 (HEVC Screen Content Coding Draft Text 2), the latest as of writing. To be noted that the invention is not limited to the implementation of the Palette coding mode as described in the HEVC SCC extension, but may apply to any palette predictive scheme.

An INTRA Coding Unit is generally predicted from the encoded pixels at its causal border by a process called INTRA prediction.

Temporal prediction of an INTER coding mode first consists in finding in a previous or future frame called the reference frame 116 the reference area of which is the closest to the Coding Unit, in a motion estimation step 104. This reference area constitutes the predictor block. Next this Coding Unit is predicted using the predictor block to compute the residue in a motion compensation step 105.

In both cases, spatial and temporal prediction, a residual is computed by subtracting the Coding Unit from the original predictor block.

In the INTRA prediction, a prediction direction is encoded. In the temporal prediction, at least one motion vector is encoded. However, in order to further reduce the bitrate cost related to motion vector encoding, a motion vector is not directly encoded. Indeed, assuming that motion is homogeneous, it is particularly advantageous to encode a motion vector as a difference between this motion vector, and a motion vector in its surroundings. In the H.264/AVC coding standard for instance, motion vectors are encoded with respect to a median vector computed between 3 blocks located above and on the left of the current block. Only a difference, also called residual motion vector, computed between the median vector and the current block motion vector is encoded in the bitstream. This is processed in module "Mv prediction and coding" 117. The value of each encoded vector is stored in the motion vector field 118. The neighbouring motion vectors, used for the prediction, are extracted from the motion vector field 118.

Next, the mode optimizing the rate distortion performance is selected in module 106. In order to further reduce the redundancies, a transform, typically a DCT, is applied to the residual block in module 107, and a quantization is applied to the coefficients in module 108. The quantized block of coefficients is then entropy coded in module 109 and the result is inserted into the bitstream 110.

The encoder then performs a decoding of the encoded frame for the future motion estimation in modules 111 to 116. This is a decoding loop at the encoder. These steps allow the encoder and the decoder to have the same reference frames. To reconstruct the coded frame, the residual is inverse quantized in module 111 and inverse transformed in module 112 in order to provide the "reconstructed" residual in the pixel domain. According to the encoding mode (INTER or INTRA), this residual is added to the INTER predictor 114 or to the INTRA predictor 113.

Next, this first reconstruction is filtered in module 115 by one or several kinds of post filtering. These post filters are integrated into the decoding loop. This means that they need to be applied to the reconstructed frame at the encoder and decoder in order to use the same reference frames at the encoder and decoder. The aim of this post filtering is to remove compression artefacts.

Figure 2:
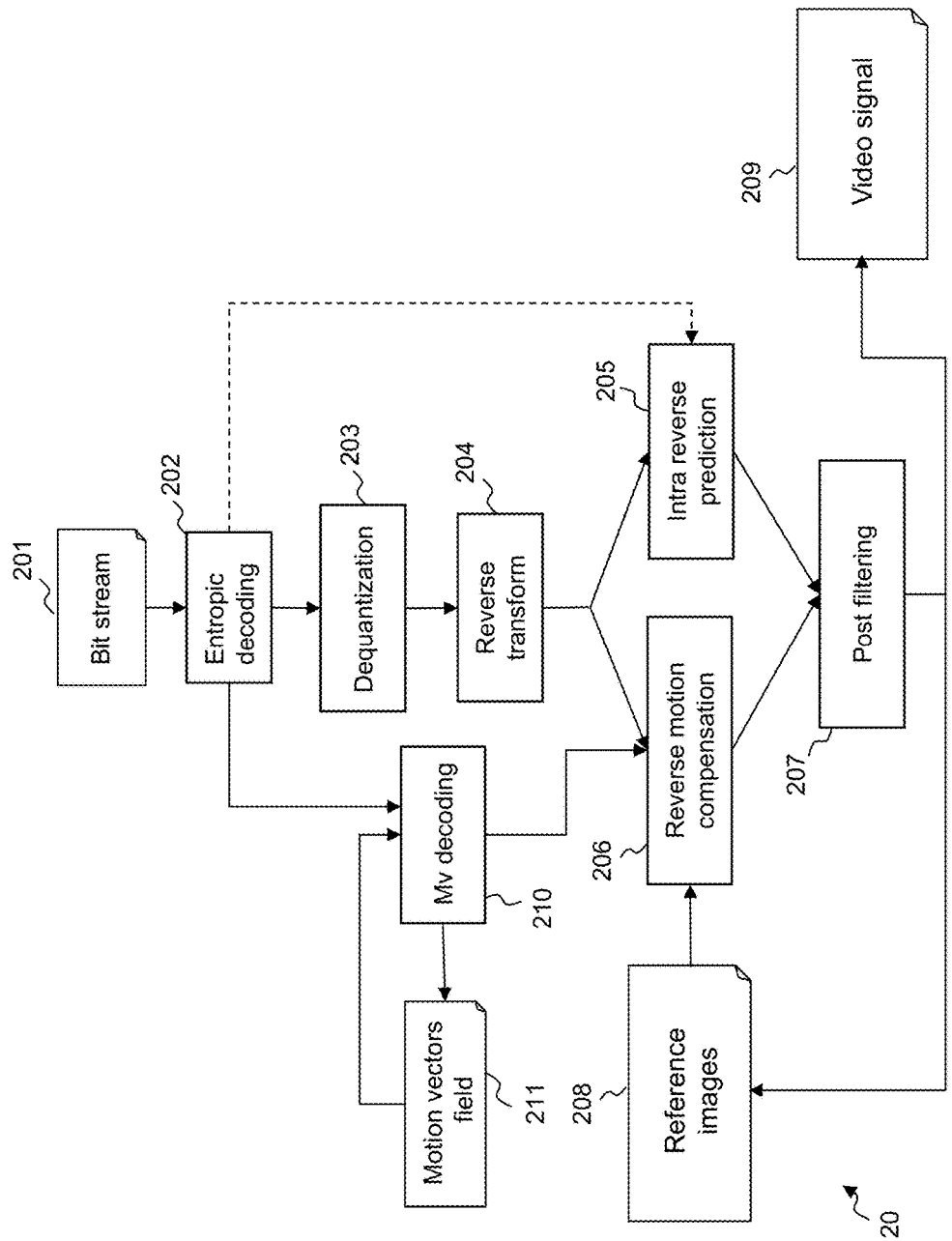
FIG. 2 illustrates the HEVC decoder architecture.

The principle of an HEVC decoder has been represented in FIG. 2. The video stream 201 is first entropy decoded in a module 202. The residual data are then inverse quantized in a module 203 and inverse transformed in a module 204 to obtain pixel values. The mode data are also entropy decoded and depending on the mode, an INTRA type decoding or an INTER type decoding is performed. In the case of INTRA mode, the INTRA prediction direction is decoded from the bitstream. The prediction direction is then used to locate the reference area 205. If the mode is INTER, the motion information is decoded from the bitstream 202. This is composed of the reference frame index and the motion vector residual. The motion vector predictor is added to the motion vector residual to obtain the motion vector 210. The motion vector is then used to locate the reference area in the reference frame 206. Note that the motion vector field data 211 is updated with the decoded motion vector in order to be used for the prediction of the next decoded motion vectors. This first reconstruction of the decoded frame is then post filtered 207 with exactly the same post filter as used at the encoder side. The output of the decoder is the de-compressed video 209.

Figure 3:
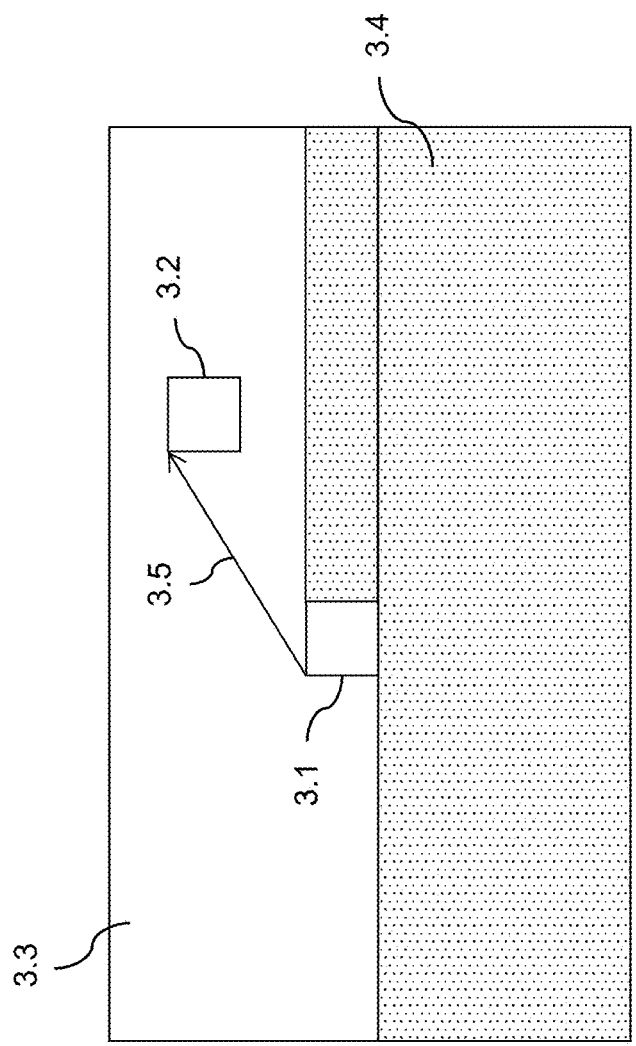
FIG. 3 illustrates the concept of the causal area.

FIG. 3 illustrates the causal principle resulting from block-by-block encoding as in HEVC.

At a high-level, an image is divided into Coding Units that are encoded in raster scan order. Thus, when coding block 3.1, all the blocks of area 3.3 have already been encoded, and can be considered available to the encoder. Similarly, when decoding block 3.1 at the decoder, all the blocks of area 3.3 have already been decoded and thus reconstructed, and can be considered as available at the decoder. Area 3.3 is called the causal area of the Coding Unit 3.1. Once Coding Unit 3.1 is encoded, it will belong to the causal area for the next Coding Unit. This next Coding Unit, as well as all the next ones, belongs to area 3.4 illustrated as a dotted area, and cannot be used for coding the current Coding Unit 3.1. It is worth noting that the causal area is constituted by reconstructed blocks. The information used to encode a given Coding Unit is not the original blocks of the image for the reason that this information is not available at decoding. The only information available at decoding is the reconstructed version of the blocks of pixels in the causal area, namely the decoded version of these blocks. For this reason, at encoding, previously encoded blocks of the causal area are decoded to provide this reconstructed version of these blocks.

It is possible to use information from a block 3.2 in the causal area when encoding a block 3.1. In the HEVC Extension draft specifications, a displacement vector 3.5, which can be transmitted in the bitstream, may indicate this block 3.2.

Figure 4:
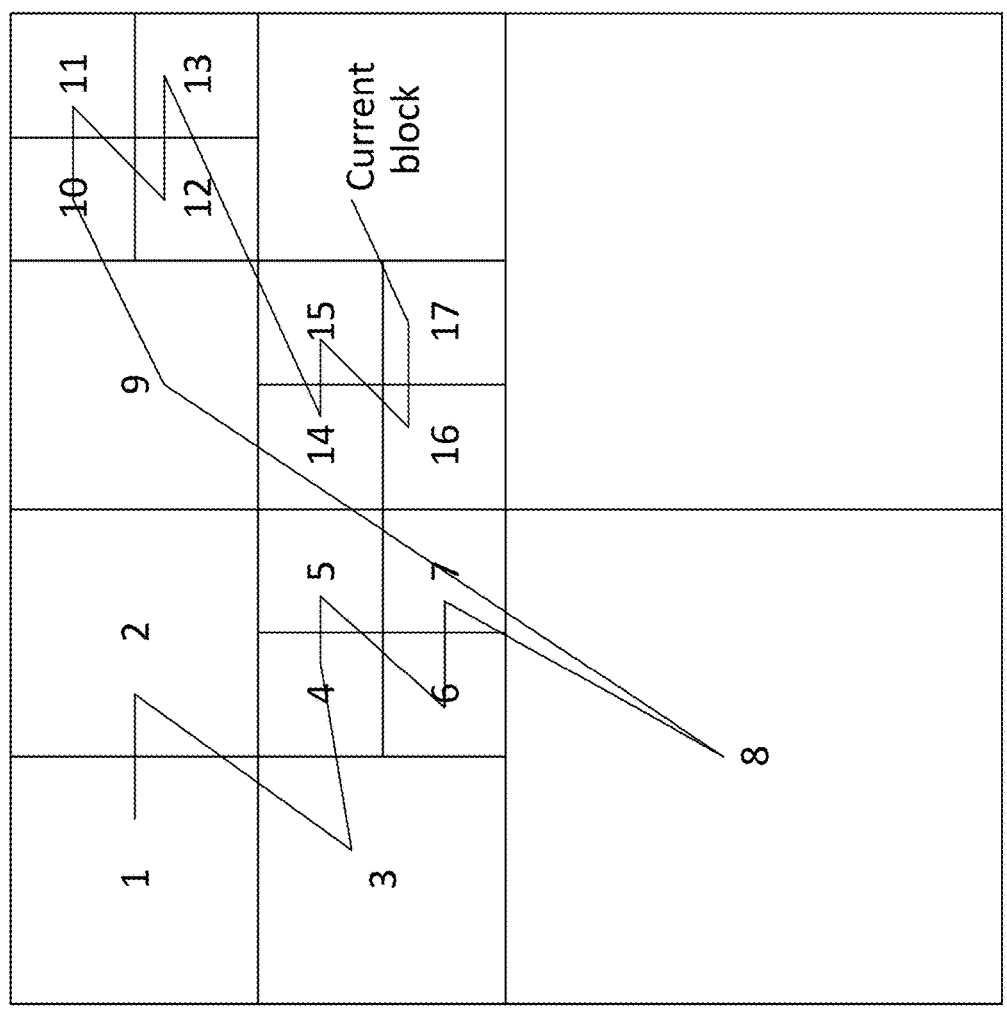
FIG. 4 illustrates the Coding Tree Block splitting into Coding Units and the scan order decoding of these Coding Unit.

FIG. 4 illustrates a splitting of a Coding Tree Block into Coding Units and an exemplary scan order to sequentially process these Coding Units. In the HEVC standard, the block structure is organized by Coding Tree Blocks (CTBs). A frame contains several non-overlapped and square Coding Tree Blocks. The size of a Coding Tree Block can range in size from 64×64 to 16×16. This size is determined at sequence level. The most efficient size, in term of coding efficiency, is the largest one: 64×64. Note that all Coding Tree Blocks have the same size except for the image border, meaning that they are arranged in rows. The size of the border CTBs is adapted according to the amount of remaining pixels.

Figure 5:
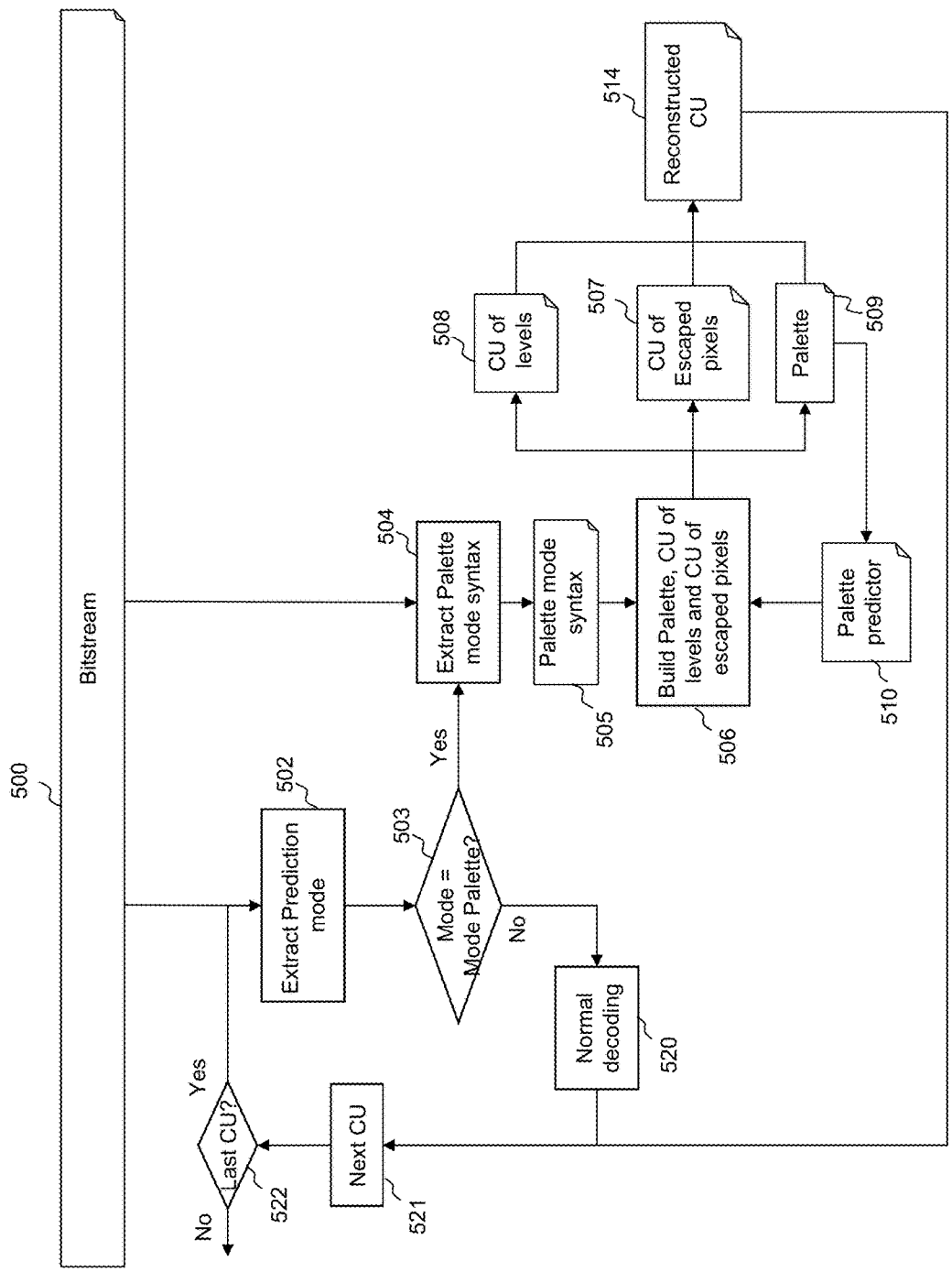
FIG. 5 illustrates the principle of Palette mode at the decoder side under investigation in the SECC Extension of HEVC, together with prediction of said palette.

Each Coding Tree Block contains one or more square Coding Units (CU). The Coding Tree Block is split based on a quad-tree structure into several Coding Units. The processing (coding or decoding) order of each Coding Unit in the Coding Tree Block follows the quad-tree structure based on a raster scan order. FIG. 5 shows an example of the processing order of Coding Units. In this figure, the number in each Coding Unit gives the processing order of each corresponding Coding Unit of this Coding Tree Block.

In HEVC, several methods are used to code the different syntax elements, for example block residuals, information on predictor blocks (motion vectors, INTRA prediction directions, etc.). HEVC uses several types of entropy coding such as the Context based Adaptive Binary Arithmetic Coding (CABAC), Golomb-rice Code, or simple binary representation called Fixed Length Coding. Most of the time a binary encoding process is performed to represent the different syntax elements. This binary encoding process is also very specific and depends on the different syntax element.

The HEVC Screen Content Coding Extension, also commonly called HEVC SCC, is an extension that is currently being drafted for the new video coding standard HEVC. It is derived from the HEVC Range Extension, also commonly called HEVC RExt.

An aim of this extension is to provide additional tools to encode video sequences in particular for the 4:4:4 colour format with 8 bits of bit-depth, and possibly losslessly, containing contents such as graphical user interfaces captures, computer-graphic generated content, etc. (known as Screen Contents).

A colour image is generally made of three colour components R, G and B. These components are generally correlated, and it is very common in image and video compression to de-correlate the colour components prior to processing the images. The most common format that de-correlates the colour components is the YUV colour format. YUV signals are typically created from RGB representation of images, by applying a linear transform to the three inputs R, G and B input frames. Y is usually called Luma component, U and V are generally called Chroma components. The term 'YCbCr' is also commonly used in place of the term 'YUV'.

Moreover some SCC's tools may be compatible with other colour formats. In particular, the palette mode has been made compatible with 4:2:0 by adjusting the 4:4:4 case which has been set to handle monochrome data by operating on a single component instead of three components. Different bit depths can also been handled.

HEVC SCC, beside lossy compression, is also able to provide a lossless encoding of the input sequences; this is to have a decoded output 209 strictly identical to the input 101. To achieve this, a number of tools have been modified or added, compared to the conventional HEVC RExt lossy codec.

Additional tools for HEVC SCC are currently being designed to efficiently encode "screen content" video sequences in addition to natural sequences. As briefly introduced above, the "screen content" video sequences refer to particular video sequences which have a very specific content corresponding to those captured from a personal computer of any other device, containing for example text, PowerPoint presentation, Graphical User Interface, tables (e.g. screen shots). These particular video sequences have quite different statistics compared to natural video sequences. In video coding, performance of conventional video coding tools, including HEVC, proves sometimes to be underwhelming when processing such "screen content".

The tools currently discussed on in HEVC SCC to process "screen content" video sequences include the Adaptive Color Transform, the Intra Block Copy mode and the Palette mode. Prototypes for these modes have shown good coding efficiency compared to the conventional method targeting natural video sequences. The present application focuses on the Palette coding mode.

The Palette coding mode of HEVC SCC is a coding mode, meaning that the information directly codes pixel data. As currently drafted, the Palette coding mode does not use residual data, but uses an "escape coding" when a pixel does not match with any entry of the palette currently used. In particular, in case of lossless coding, this means the palette entry should be selected as equal to the pixel by the encoder, or that the escape coded pixel is not quantized, the quantizer value being transmitted at the CU level.

Figure 6:
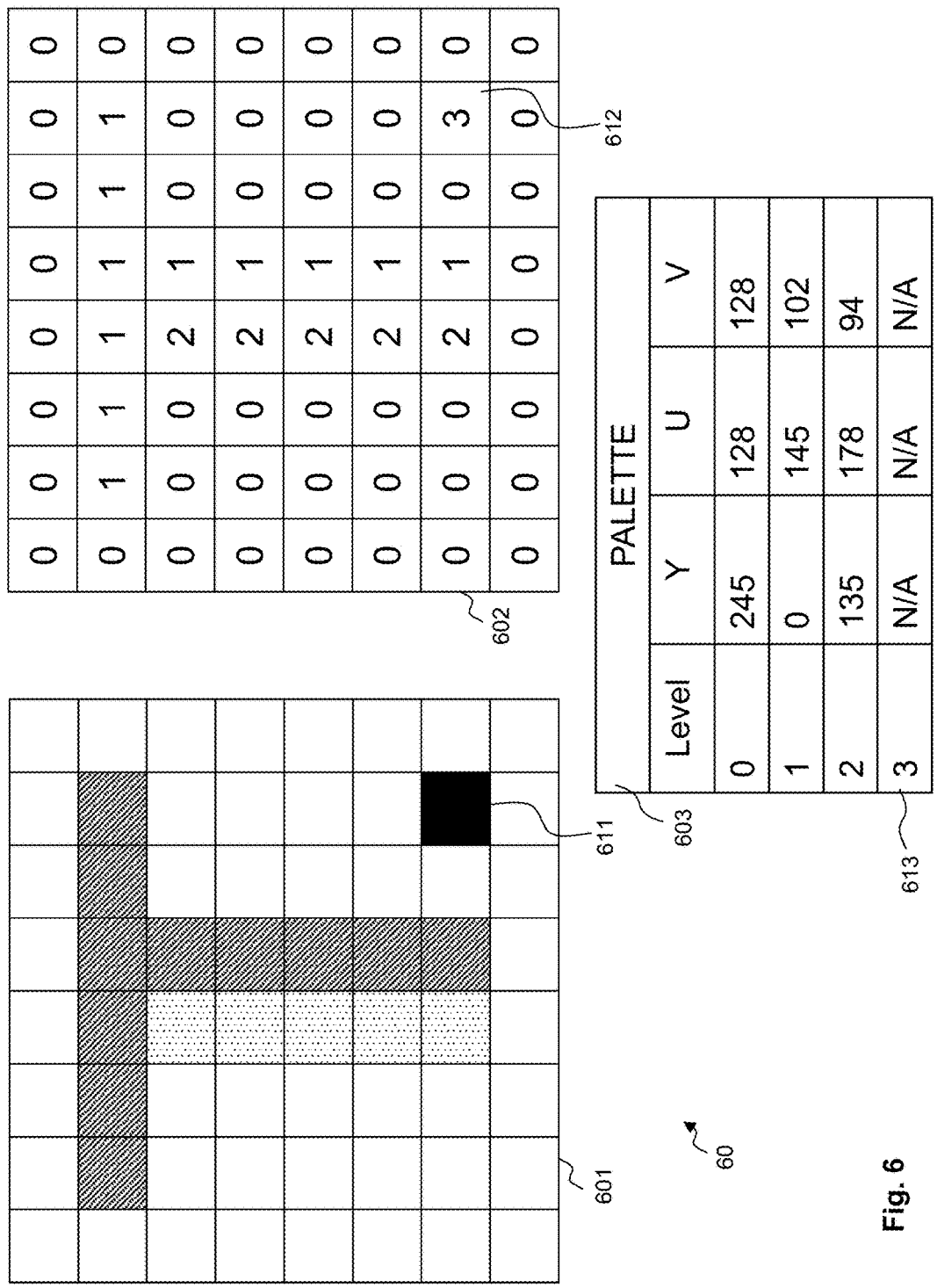
FIG. 6 illustrates an example of a coding unit with its corresponding block of levels and the associated palette.

A palette is generally represented by a table containing a finite set of N-tuple of colours, each colour being defined by its components in a given colour space (see for example 603 in FIG. 6 based on YUV colour space). For example, in a typical RGB format, the palette is composed of a list of P elements of N-tuple (where N=3 for a RGB). More precisely, each element corresponds to a fixed triplet of colour components in the RGB format. Of course this is not limited to a RGB or YUV colour format. Any other colour format can be represented by a palette and can use a smaller or a higher number of colour components, meaning that N may be different from 3.

At the encoder side, the Palette mode, under consideration in HEVC SCC, consists in transforming pixel values of a given input coding unit into indexes called levels. The levels identify the entries in an associated palette, the pixel values of which match the pixel values of the input coding unit. However, when a pixel value of the input coding unit cannot be represented by a level (i.e. it does not match), e.g. because the distortion would be too large (greater than 0 in case of lossless coding), then said pixel is represented by a specific level, indicating "escape coding". For each pixel being represented by this specific "escape coding" level, quantized pixel values are furthermore transmitted.

After the transformation, the resulting coding unit is composed of a block of levels and a block of quantized values (for the escape-coded pixels). It is then transmitted to the decoder with the associated palette, generally a table having a finite number of triplets of colours used to represent the coding unit. Since the palette defines a finite number of colours, the transformation into a block of indexes usually approximates the original input coding unit in lossy coding, but strictly corresponds to the original input coding unit in lossless coding.

To apply the Palette mode at the encoder side, an exemplary way to transform a coding unit of pixels is performed as follows:

- find the P triplets best describing the coding unit of pixels to encode, for example by minimizing overall distortion;
- then associate with each pixel of the coding unit the matching colour among the P triplets: the value to encode (or level) (which thus forms part of the block of indexes) is then the index corresponding to the entry of the associated matching colour. The block of indexes is thus obtained from the palette by comparing the entries of the palette to each pixel of the coding unit, in order to identify, for each pixel, the entry which defines the matching colour. If no entry matches, then the level indicating escape coding, as well as quantized pixel values, is associated with the pixel (in the block of quantized values).

For each coding unit, the palette (i.e. the P triplets found), the block of indexes or levels and the block of quantized pixel values are coded in the bitstream 110 and sent to the decoder.

Furthermore, specific flags may be provided in some sets of parameters in the bitstream to specify whether or not the Palette coding mode is activated (for instance in the Sequence Parameter Set, or "SPS"). Those sets of parameters are also referred to as syntax structures.

Also, at the coding unit level, a flag may specify whether or not the coding unit has escape-coded values, to force the palette to include the above-mentioned specific "escape coding" level.

At the decoder, the Palette coding mode consists in performing the conversion in the reverse way. This means that each decoded index associated with each pixel of the coding unit is replaced by the corresponding colour in the palette decoded from the bitstream, in order to reconstruct the corresponding colour for each pixel of the coding unit. Note that if a pixel is associated with the "escape coding" level, then the corresponding quantized pixel value is decoded and inverse quantized from the block of quantized pixel values (i.e. of escape-coded pixels). This is the reconstruction of the block of indexes in the colour space (i.e. of the coding unit predictor).

FIG. 5 further illustrates the principle of the Palette coding mode at the decoder. When decoding a slice, frame or tile, the decoding process loops over the CUs from the bitstream, starting from a first coding unit. Then, the prediction mode for the current coding unit is extracted at step 502 from the bitstream 501. Currently, the Palette mode is identified by a flag located after the skip flag and the intra block copy flag in the bitstream (the other coding modes have been described above with reference to FIGS. 1 and 2). This flag is CABAC coded using a single context. If this mode is not the Palette mode 503 then conventional decoding occurs on step 520. Otherwise, the related syntax of the Palette mode 505, i.e. the information on the palette, the block of levels and the block of escape-coded pixels, is extracted and decoded 504 from the bitstream 501.

Next, during step 506, the following elements are built from the decoded data: the palette 509, the block of escape-coded pixels 507 and the block of levels 508. In particular, HEVC SCC provides that the palette is predicted from a palette predictor 510. From the block of levels, the associated palette and the block of escape-coded pixels, the reconstructed coding unit in pixel domain 514 is built. This means that for each level of the block of levels, a colour (RGB or YUV) is associated with each pixel.

Palette 509 is then used to update palette predictor 510 for use in decoding other palette-coded CUs.

To be noted that the prediction of palette 509 using palette predictor 510 may not use all the entries of palette predictor 510. Information on the used entries of palette predictor 510 or the non-used entries, as well as information on the size of the last used palette may be stored. Such information is reused as described below.

FIG. 6 illustrates the principle of the Palette coding mode at the encoder. The current coding unit 601 is converted into a block 602 of the same size which contains a level for each pixel instead of three colour values (Y, U, V) or (R, G, B). For means of illustration, pixel 611 of 601 is actually escape-coded and therefore, its associated level 612 indicates the escape coding level 613 (value "3") of the palette. As a consequence, block 604 of escape-coded pixels contains the quantized pixel value of a single pixel 620. The palette 603 associated with block of levels 602 is built based on coding unit overall distortion minimization and associates at each entry, an entry index or level with corresponding pixel colour values. Note that for monochrome application, the pixel value can contain only one component.

As mentioned above in relation to FIG. 5, the palette (as well as the block of escape-coded pixels) is coded and inserted into the bitstream for each coding unit. In the same way, the block of levels (corresponding to the coding unit) is coded and inserted into the bitstream and an example of the coding is given below with reference to FIG. 7. In this example, the block of levels is scanned in a horizontal order.

The block of levels 71 is exactly the same as the one illustrated in FIG. 6 under reference 602. The tables 72 and 73 describe the successive syntax elements used to code the block of levels 71. Table 73 should be read as the continuation of table 72. The syntax elements in the table correspond to the encoding of the groups of levels surrounded by bold lines in the block 71.

The block of levels is encoded by group of successive pixels in scan order. Each group is encoded using a first syntax element giving a prediction direction, a second element giving the repetition, and an optional third element giving the value of the pixel, namely the level. The repetition corresponds to the number of pixels in the group.

These two tables represent the current syntax associated with the Palette coding mode. These syntax elements correspond to the encoded information inserted in the bitstream for the block of levels 71. In these tables, three main syntax elements are used to fully represent the operations of the Palette coding mode and are used as follows when successively considering the levels of the block of levels 71.

A first syntax element, called "Pred mode" makes it possible to distinguish between two encoding modes. In a first mode corresponding to "Pred mode" flag equal to "0", a new level is used for the current pixel. The level is immediately signalled after this flag in the bitstream. In a second mode corresponding to "Pred mode" flag equal to "1", a "copy up" mode is used. More specifically, this means that the current pixel level corresponds to the pixel level located at the line immediately above starting on the same position for a raster scan order. In that case of "Pred mode" flag equal to "1", there is no need to signal a level immediately after the flag because the value of the level is known by reference to the value of the level of the pixel just above in the block of levels 71.

A second syntax element called "Level" indicates the level value of the palette for the current pixel only in the first mode of "Pred mode", or the level value for escape-coding of the pixel.

A third syntax element, called "Run", is used to encode a repetition value in both modes of "Pred mode". Considering that the block of levels 71 is scanned from the top left corner to the bottom right corner, row by row from left to right and top to bottom, the Run syntax element gives the number of successive pixels in block 71 having the same encoding.

This "Run" syntax element has a different meaning which depends on the "pred mode" flag. When Pred mode is 0, "Run" element is the number of successive pixels of the block of indexes having the same level value. For example, if Run=8 this means that the current "Level" is applied to the current pixel and to the following 8 pixels which corresponds to 9 identical successive samples in raster scan order.

When Pred mode is 1, "Run" element is the number of successive pixels of the block of indexes having a level value corresponding to the level value of their above pixel in block 71, i.e. where the "copy up" mode is applied. For example, if Run=26 this means that the level of the current pixel is copied from the pixel of the line above as well as the following 26 pixels which corresponds to 27 pixels in total.

Tables 72 and 73 represent the nine steps to represent the block 71 by using the Palette coding mode. Each step starts with the coding of the "Pred mode" flag which is followed by the "Level" syntax element when "Pred mode" flag equals "0", or by the "Run" syntax element when "Pred mode" flag equals "1". The "Level" syntax element is always followed by a "Run" syntax element.

When the prediction mode decoded for the current block is the palette mode, the decoder first decodes the syntax relating to this block and then applies the reconstruction process for the coding unit.

Figure 8:
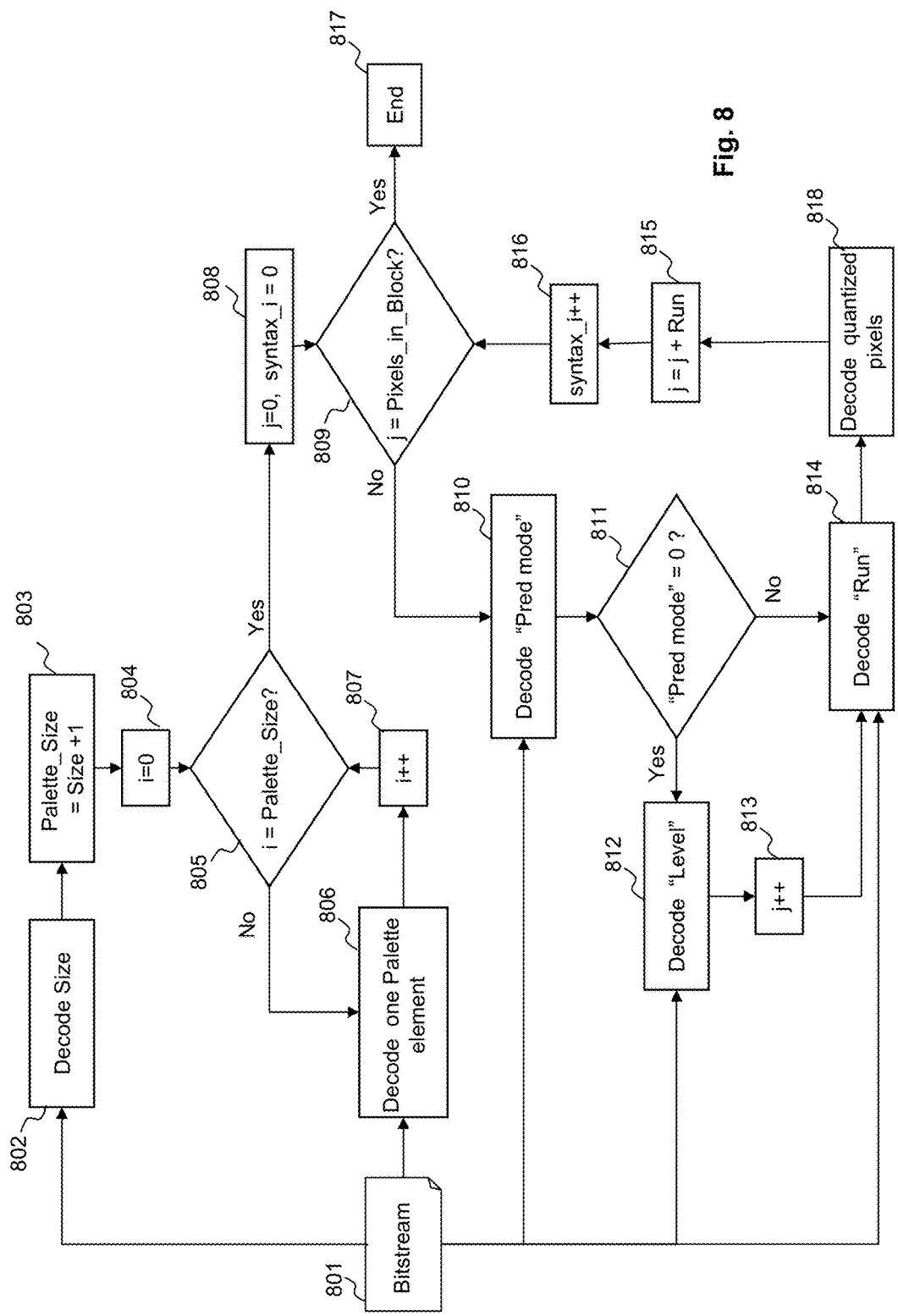
FIG. 8 illustrates the decoding process of the syntax elements relating to the Palette coding mode.

FIG. 8 illustrates the decoding process of syntax elements relating to the Palette coding mode. First, the size of the palette is extracted and decoded 802 from the bitstream 801. The exact size of the palette (Palette_size) is obtained by adding 1 to this size value decoded at step 802. Indeed, the size is coded by using a unary code for which the value 0 has the smallest number of bits (1 bit) and the size of the palette cannot be equal to 0, otherwise no pixel value can be used to build the block predictor.

Next the process corresponding to the palette values decoding starts. A variable i corresponding to the index of the palette is set equal to 0 at step 804 next a test is performed at step 805 to check whether i is equal to the palette size (Palette_size) or not. If it is different from the palette size at step 805, one palette element is extracted from the bitstream 801 (in case the palette is directly encoded in the bitstream) and decoded at step 806 and is then added to the palette with the associated level/index equal to i. Then the variable i is incremented through step 807. If i is equal to the palette size at step 805, the palette has been completely decoded.

Next the process corresponding to the decoding of the block of levels 71 is performed. First, the variable j, corresponding to a pixel counter, is set to 0 as well as the variable syntax_i 808. Then a check is performed to know whether the pixel counter corresponds to the number of pixels contained in the block. If the answer is yes at step 809 the process ends at step 817, otherwise the value of the flag "Pred mode" corresponding to one prediction mode is extracted from the bitstream 801 and decoded 810.

The value of "Pred mode" is added to a table at the index syntax_i containing all "Pred mode" value decoded. If the value of this "Pred mode" is equal to 0, step 811, the syntax element corresponding to "Level" is extracted from the bitstream 801 and decoded 812. This variable "Level" is added to a table at the index syntax_i containing all levels decoded. The variable j corresponding to the pixel counter is incremented by one 813.

Next the "Run" syntax element is decoded at step 814. If the syntax element "Pred Mode" is equal to 1, step 811, the "Run" value is also decoded at step 814. This syntax element "Run" is added to a table at the index syntax_i containing all the runs decoded.

Figure 7:
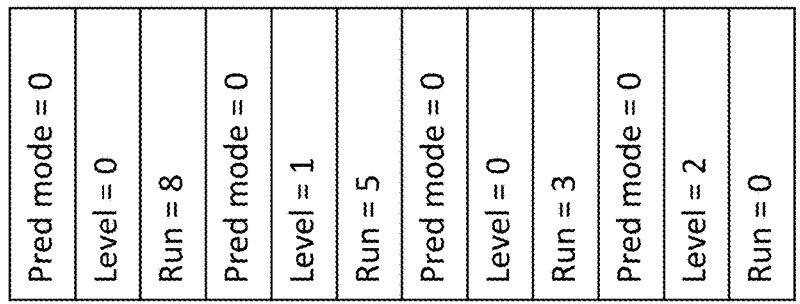
FIG. 7 illustrates the same block of levels and the set of syntax elements used for the encoding of this block of levels.

Next, at step 818, for each pixel that is escape-coded as indicated by its level (i.e. if the extracted Level equals the "escape coding" level, for instance "3" in the example of FIGS. 6 and 7), the associated quantized pixel value is parsed and dequantized from the block of escape-coded pixels. The dequantized pixel value is for instance stored in a corresponding table at the index syntax_i.

Note that step 818 may be performed just after step 812. In a variant, the whole block of escape-coded pixels may be extracted from the bitstream and dequantized in a step between step 809 and step 817.

Next at step 815, the value j is incremented by the value of the run decoded at step 814. The variable syntax_i is incremented by one to consider the next set of syntax elements. If the counter j is equal to the number of pixels in the block then the syntax to build the block of levels 71 is finished (817). At the end of this process, the decoder knows the palette, and the tables containing the list of all the "Pred mode", "Level" and "Run" syntax elements associated with the Palette coding mode of this coding unit, and also knows the table of dequantized pixel values for the escape-coded pixels. The decoder can then proceed with the reconstruction process of the coding unit as described through FIG. 5.

In a slight variant of this embodiment of FIG. 8, the "Pred mode" element is not provided for the first line of pixels at the top of the block of levels 71. This is because, since these pixels are deprived of levels at a line above, the "copy up" mode cannot be executed. Therefore, as long as j is less than the block width at step 809, no "Pred mode" element is provided and steps 810-811 are shortcut, thereby directly performing step 812. Note that this slight variant decreases the size of the encoded block of levels.

In an embodiment that can be combined with either the above embodiment of FIG. 8 or its slight variant, several blocks of levels may be generated instead of only one. This means that several levels are used for all or parts of the pixels. For instance, a first block of levels may be built for a first colour component (Y for example), while another block of levels may be built for the at least one remaining component (U and V for example). Of course, three blocks of levels for the three colour components may be contemplated. The choice to have several blocks of level and their correspondence with the colour components may be signalled in the bitstream using specific flags. In a variant, this may be implied by the colour format of the image.

Referring back to the palette, each palette element, constituted by three values in the above examples, is generally encoded using three binary codes. The length of the binary codes corresponds to the bit-depth of each colour component. The "Pred mode" element is encoded using one bit. The "Level" element is encoded using binary code with binary code length equal to b, where $2^b$ is the smallest integer equal or above the palette size.

Figure 9:
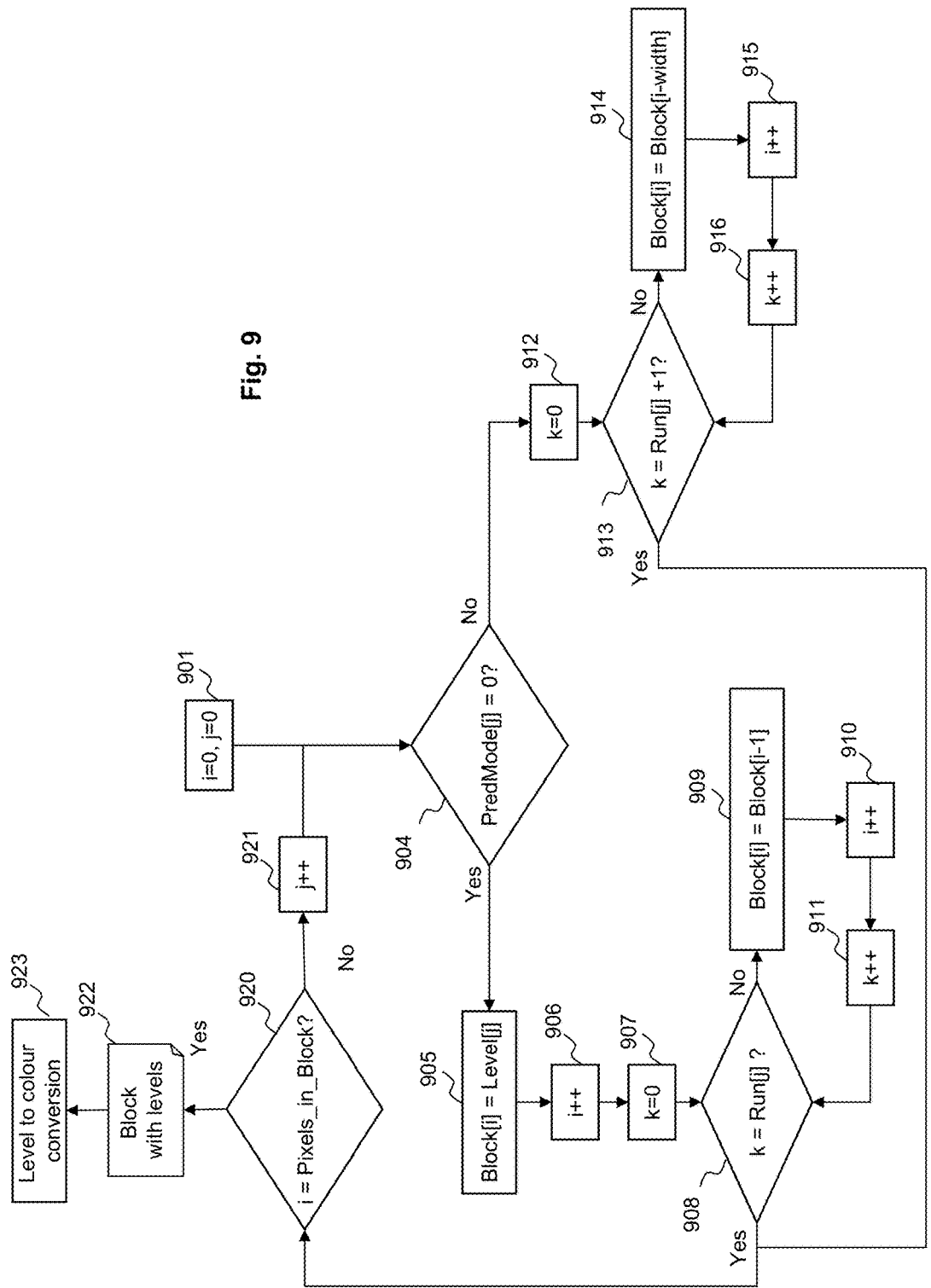
FIG. 9 illustrates the reconstruction process to build the block of levels at the decoding side.

FIG. 9 illustrates the reconstruction process to build the block of levels 91. The input data of this process are the tables obtained using the process of FIG. 8 above, and containing the list of "Pred mode", "Level" and "Run".

An additional item of input data to the "Pred mode", "Level" and "Run" elements is the size of the coding unit 801 (which is the same as the size of the block of levels 602/71) known from the quadtree (FIG. 4) signalled in the bitstream.

In a first step 901, a variable i, representing a pixel counter, is set equal to 0 and a variable j, to successively consider each set of syntax elements, is also set equal to 0. At step 904, the element Pred_mode[j] extracted from the table of "Pred mode" at index j is checked against 0.

If it is equal to 0, a new level is encoded for the current pixel i. As a consequence, the value of the pixel at position i is set equal to the level at the index j from the table of levels; Block[i]=Level[j]. This is step 905. The variable i is incremented by one at step 906 to consider the next pixel, and the variable k, dedicated to count the pixels already processed in the current Run, is set equal to 0 at step 907.

A check is performed at step 908 to determine whether or not k is equal to the "Run" element of the table of runs at the index j: k=Run[j]?. If not equal, the level of the pixel at position i is set equal to the level value of the pixel at position i−1: Block[i]=Block[i−1]. This is step 909. The variable i and the variable k are then incremented by one at respectively steps 910 and 911. If k=Run[j] at step 908, the propagation of the left level value is finished and step 920 is performed (described below).

If Pred_mode[j] is different from 0 at step 904, the "copy up" mode starts with the variable k set equal to 0 at step 912. Next, step 913 checks whether or not (k−1) is equal to the "Run" element of the table of runs at the index j: k=Run[j]+1? If not equal, the level value of the pixel at position i is set equal to the level value of the pixel at position i of the above line: Block[i]=Block[i−width], where "width" is the width of the block of levels (the same as the coding unit) as deduced from the input size of the coding unit. This is step 914. Next, the variable i and the variable k are incremented by one at respectively steps 915 and 916. If k=Run[j]+1 at step 913, the prediction mode 'copy up' is completed and the process goes on at step 920.

At step 920, a check is performed to determine whether or not the variable i is equal to the amount of pixels in the block 71/CU 601. If not equal, the variable j is incremented by one at step 921 to consider the next set of syntax elements and the process loops back to step 904 described above.

If all the pixels have been processed at step 920, the final block of levels 71 is obtained at step 922: this corresponds to table Block[ ].

Next, a final step 923 consists in converting each level in colour values using the palette 603 decoded using the process of FIG. 8 and using block 604 of dequantized pixel values for the escape-coded pixels. This final step affects pixel values (Y, U, V) or (R, G, B) at each block position according to the level of this position in the block and either the corresponding entry in the palette 603 if any, or the corresponding dequantized pixel value in block 604.

As described above, the Palette coding mode as currently designed in HEVC SCC requires a palette to be transmitted for each coding unit. This represents a large amount of data in the bitstream, and thus a coding cost. In order to reduce that cost, some proposed mechanisms provide the current palette for a current coding unit to be predicted using a palette predictor.

As proposed in Applicant's contribution JCTVC-Q0063, a reference palette predictor can be transmitted in the bitstream to be used by each coding unit of a slice for instance; or the palette predictor can be built using pixels neighboring the coding unit processed; or the predictor can be built from two or more palettes already existing.

The prediction process thus modifies step 806 of forming the palette from the bitstream.

Figure 10:
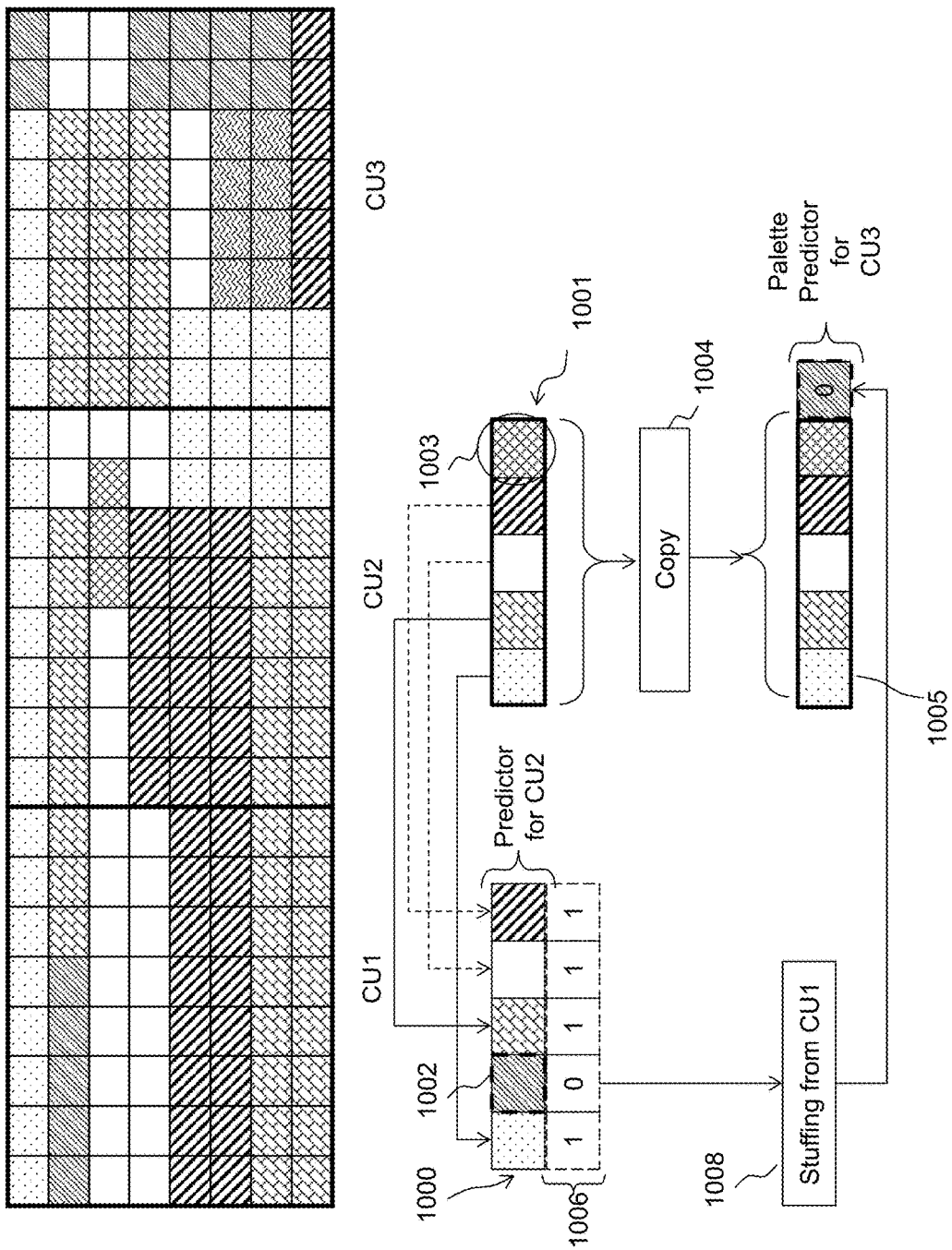
FIG. 10 illustrates a prediction scheme including an exemplary iterative building of a palette predictor.

FIG. 10 illustrates a prediction scheme including an exemplary iterative building of a palette predictor. In this scheme, the palette predictor under construction includes entries from a first palette which has been predicted based on a second palette (used as predictor) using a bitmap of flags, each flag of which defining whether or not a corresponding entry in the second palette is selected as an entry to predict an entry in the first palette. The bitmap of flags may be transmitted in the bitstream.

Particular to this embodiment is that the palette predictor is built by also including the entries of the second palette corresponding to a flag of the bitmap that defines no selection of the entry to predict the first palette.

In reference to FIG. 10, three Coding Units, CU1 to CU3, are shown that may be consecutive coding units being processed in a current image.

Reference 1000 represents the palette used to process (encode or decode) CU1. This palette may have been encoded in the bitstream (and thus retrieved by the decoder) or predicted using any mechanism described in the present application.

Palette 1000 is used as a palette predictor for building palette 1001 to process CU2. The prediction of palette 1001 is based on bitmap 1006 of flags. It is to be recalled that the flags take the value 1 or 0 depending of the use or not, respectively, of the corresponding element for predicting the palette of a next CU. In a variant, flag=1 may mean not selecting the corresponding element, while flag=0 may mean selecting the element for predicting the palette of the next CU.

As a result, in the present example, the first, third, fourth and fifth elements of palette predictor 1000 are copied into palette 1001 as defined in the bitmap 1006. The second element 1002 is not reused (flag=0 in bitmap 1006). Note that an additional palette element 1003 may have been added to the end of palette 1001 being built, based on the mechanisms described above (e.g. explicitly transmitted in the bitstream).

Also, a palette predictor 1005 is built from palettes 1000 and 1001. All the elements of palette 1001 are copied (step 1004) into palette predictor 1005 for CU3. In this example, the entries of palette predictor 1000 corresponding to a flag of the bitmap that defines no selection of the entry to predict palette 1001 (i.e. usually with flag=0, for example element 1002), are added (step 1008) to palette predictor 1005. This is because the other entries of palette predictor 1000 are already in palette predictor 1005 thanks to the copying step 1004. This selection of element 1002 can be performed very quickly thanks to the flags in bitmap 1006.

This approach makes that a next palette predictor for a next block of pixels is built from only the current palette used to encode the current block of pixels and a current palette predictor used to predict the current palette A bitmap may be provided to predict, based on palette predictor 1005, the palette to process CU3.

Of course, palette predictor 1005 may also be directly the palette to process CU3. However, palette predictor 1005 continuously grows as it includes all the elements defined in previous palettes, up to a limit defining the maximum size of the palettes.

The addition of element 1002 is preferably performed at the end of palette predictor 1005. One may directly observe that the resulting palette predictor is enriched compared to situations described above.

One particular advantage of adding the unused elements at the end of the palette predictor is that the elements are approximately ordered by their age and their level of use. This results in having the last elements in the palette predictor that are the least useful ones and the most likely to be removed. A decision can thus be taken to remove some elements from the palette predictor under construction, for example based on the number of uses of this element when processing to the last M (M integer to be defined) blocks of pixels using respective palettes that include this element.

Of course, this process can be adapted so as to put unused elements first in the palette predictor, or even interleaved with some of the elements from palette 1001.

Note that the selection of unused elements from a previous palette guarantees that the elements are unique, and therefore the flags in the bitmap are not redundant. The palette predictor efficiency is thus maximized.

However, there are situations that currently break the current palette prediction scheme.

Some of those situations are related to the use of HEVC coding tools/structures aimed at error resilience and/or parallel processing. These tools/structures usually disallows any dependency between coding structures inside an image.

It is reminded here that the image is usually recursively split into hierarchical coding structures, for instance, tiles made of slices, with slices made of CTBs, each of which is split into CUs as shown in FIG. 4. The parameters defining the hierarchical coding structures are generally contained in the Sequence Parameter Set (i.e. valid for the sequence) and/or the Picture Parameter Set (i.e. that can be updated). Thus, the coding structures must refer to the information stored in these SPS and PPS by indicating an ID of said SPS/PPS, which is an integer coded using a variable-length scheme.

The absence of dependency between some coding structures means for instance that no INTRA prediction can be performed at the boundaries of the coding structure, and no entropy coding state, palette predictor or area for IBC prediction can be shared between coding structures.

As briefly mentioned above, one of such coding structures is the tile structure, which splits an image into different rectangles containing full CTBs. Whether the sequence uses tiles, and the shape of the tiles, are usually contained in the SPS.

The tile rows or columns may not be homogeneously distributed. This is the case in image 1100 of FIG. 11, which is split in four tiles 1102, 1103, 1104 and 1105.

Another already-mentioned coding structure is the slice structure. The slice is the base coding structure above the CTB, meaning that a slice is made of one or more CTBs, and a tile is made of one or more slices, and an image can be made of one or more tiles (and thus slices).

Figure 11:
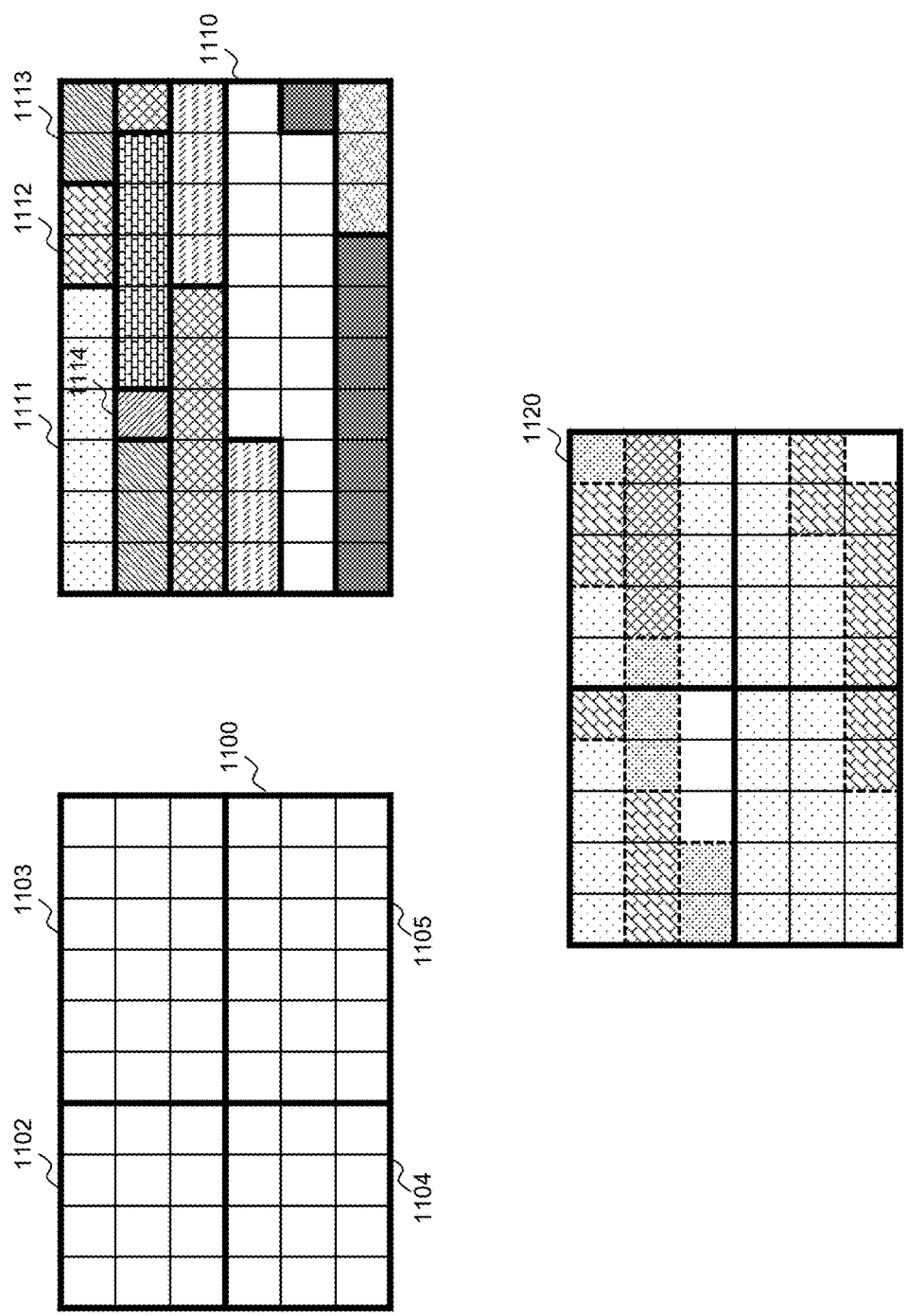
FIG. 11 illustrates various block structures used in video coding.

As an example, image 1110 of FIG. 11 contains slices 1111, 1113, 1114 etc. In particular, slice 1114 can be seen to contain only one CTB.

Each slice includes a slice header that comprises (in no particular order): a piece of information regarding the starting CTB address (in raster scan) which depends on the CTB size and tile configuration, the IDs of the SPS and PPS on which the slice depends.

HEVC provides that the tiles and slices are "self-contained", i.e. they are encoded/decoded independently of each other tiles and slices, respectively. The present invention focuses on such self-contained coding structures.

To be noted that some specific cases provides that a group of slices may be marked as actually fully dependent, meaning that some coding information are inherited from one slice to the next slice. In these cases, the present invention only focuses on the first slice of the set of dependent slices.

To further illustrate the "self-contained" feature of the slice structure, one can refer to image 1120, which contains four homogeneous tiles (delimited by bold lines), each tile containing slices (having different filling patterns) with varying CTB counts.

Because a non-dependent current slice or a tile cannot refer to another slice or tile respectively, errors in the other slices or tiles do not impact the decoding of the current slice or tile. In addition, the coding results for the current slice or tile do not depend on these others slices or tiles. So, they can be encoded or decoded in parallel.

One drawback of the "self-contained" property is that data useful to prediction are no longer unavailable when switching to a new slice or tile, therefore reducing coding efficiency. This is even more the case with SCC, in which there is a high level of information redundancy within a single image. It is therefore desirable in those cases to alleviate some of that coding efficiency loss.

In this context, the present invention provides the following steps:

obtaining, from the bitstream, a palette predictor initializer associated with a coding structure hierarchically above the two self-contained coding structures to be decoded; and initializing the palette predictor for each of the two self-contained coding structures using the same obtained palette predictor initializer.

Symmetrically at the encoder's end, the present invention provides the following steps:

determining a single palette predictor initializer to initialize the palette predictor for the two self-contained coding structures; and in the bitstream, providing the encoded data including the prediction information to predict the palette associated with each processed pixel block from a palette predictor and providing the palette predictor initializer, wherein the palette predictor initializer is associated with a coding structure hierarchically above the two self-contained coding structures in the bitstream.

As proposed by the present invention, a palette predictor initializer is used to simply initialize the palette predictor, which quite provides good results in terms of both coding efficiency and complexity. One may note that the palette predictor initializer is never used as a palette itself for performing the Palette coding mode.

Also, the present invention provides that the palette predictor initializer is "global", meaning that it is signalled once in the bitstream while it is used by several independent coding structures, tiles or slices. This is achieved by signalling it in association with a coding structure hierarchically above the coding structures requiring initialization of their palette predictor due to the "self-contained" property.

Storing it at the slice level, i.e. at the same level as the coding structures (slices) requiring it, appears to be inefficient to the inventors. This is because the split of the image into slices is the very reason for a loss of coding efficiency.

The description below intends to propose efficient storage and transmission mechanism for said initializer.

In one embodiment, the palette predictor initializer is defined (and thus transmitted in the corresponding part of the bitstream) at the image level in the Picture Parameter Set, PPS, in which case the two self-contained coding structures refer to the Picture Parameter Set. For instance, two self-contained slices include the PPS ID within their respective header.

In a variant, the palette predictor initializer is defined at a sequence level in a Sequence Parameter Set, SPS, in which case the two self-contained coding structures refer to the Sequence Parameter Set.

Preference is given to its definition in the PPS. This is because storing it at the SPS level disallows several encoder optimizations such as updating the initializer after a certain amount of frames or time, and/or using an initializer per area of an image (e.g. tile or arbitrary area).

However, as mentioned above, a slice refers to a PPS through its PPS ID. The more PPSs are sent, the larger the IDs become and thus the more bits are required to encode them. It is not forbidden but strongly suggested by the standardization organisations not to have several PPSs sharing the same ID: indeed, it would be possible to decode them in an incorrect order and associate incorrect information to slices. A potential solution to this issue is a wraparound mechanism: when reaching a value MAX, the PPS ID is reset to 0. While this does not fully prevent incorrect decoding, it greatly reduces the risks, as the PPSs with same ID can now be distant by an arbitrary duration.

Reference is now made to FIGS. 12a-12b to 14a-14d to illustrate embodiments of the invention.

Figure 12A:
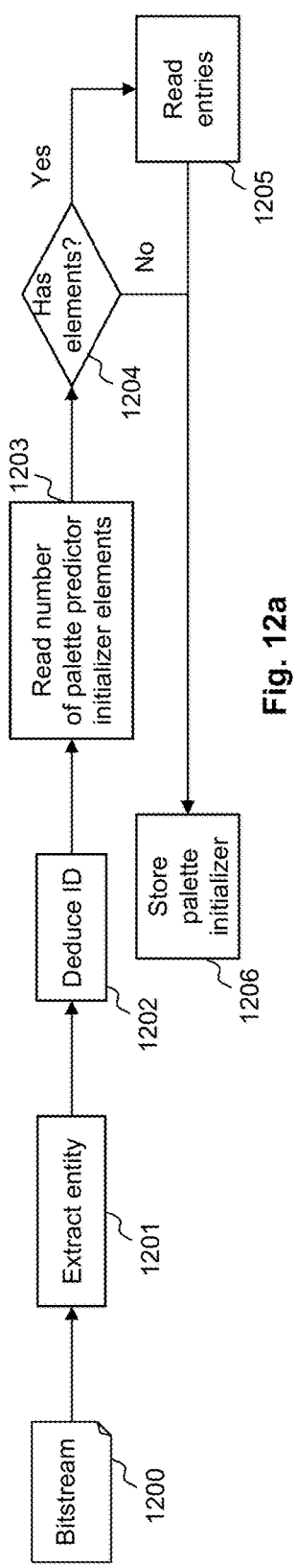
FIG. 12a illustrates the parsing of a palette predictor initializer from a bitstream.
Figure 12B:
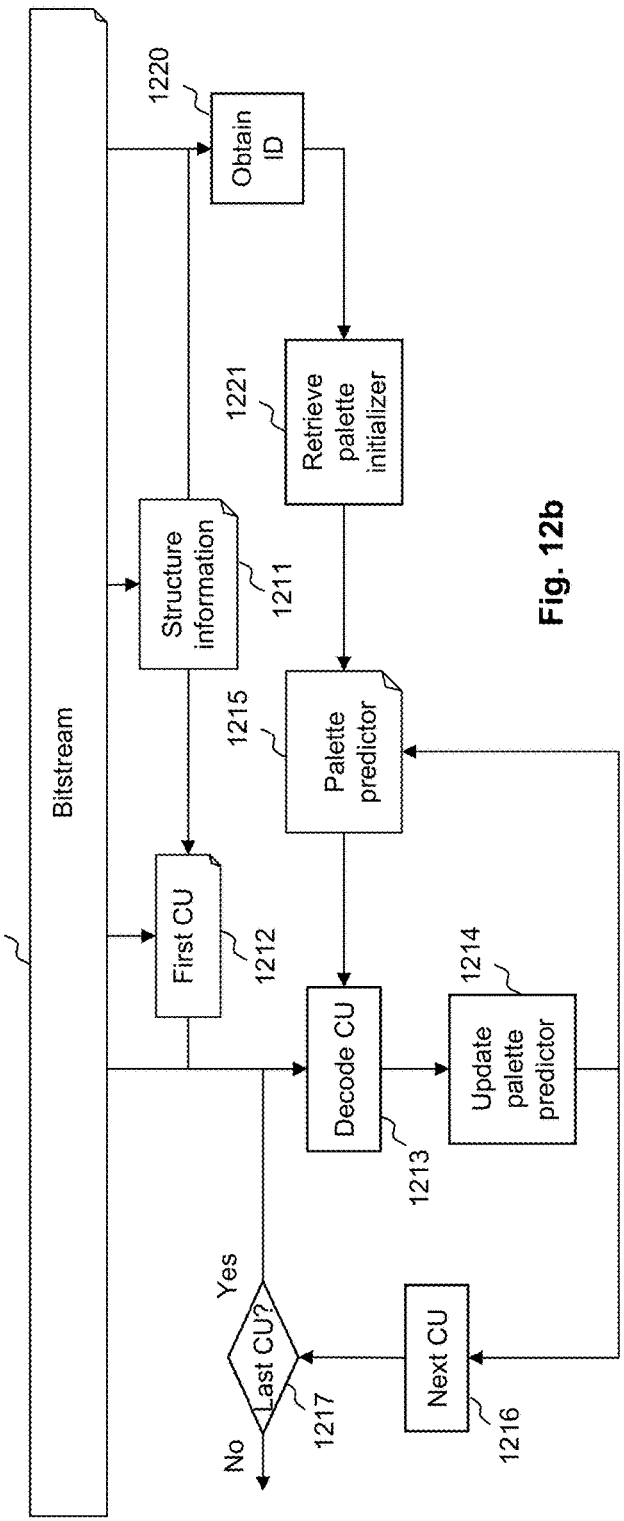
FIG. 12b illustrates the use of a palette predictor initializer by the decoder for decoding a bitstream.

FIGS. 12a-12b illustrate exemplary processing at the decoder's end and includes FIG. 12a illustrating the retrieval of a palette predictor initializer from a sequence's bitstream 1200.

A syntax structure associated with a coding structure of high hierarchical level is extracted and decoded from the bitstream at step 1201. This syntax structure may be the SPS associated with the sequence, or the PPS associated with images.

Next, the ID for that syntax structure is deduced at step 1202: it is the PPS ID for a PPS and the SPS ID for an SPS.

Next, the number of entries in the palette predictor initializer is read from the extracted syntax structure at step 1203. To be noted that the maximum size of the palette predictor to be used by the Palette coding mode is specified in the SPS, and thus the size indicated by the extracted syntax structure is subject to that limit, meaning it is less or equal to this maximum size.

In the case where the extracted syntax structure is the SPS, the palette predictor initializer is preferably located after information defining whether or not the Palette coding mode is activated for the sequence, and also after the maximum size of the palette predictor. This particular location makes it possible to avoid parsing and reading the palette predictor initializer data (the number of entries of the initializer) if the palette mode is deactivated (for instance if the extracted syntax structure is tailored for coding of natural content, and not for screen content).

At step 1204, the process determines, based on the number of entries read at step 1203, whether the palette predictor initializer has entries or not.

If it comprises at least one entry, the entry or entries are obtained from the bitstream at step 1205. The mechanism to read the palette predictor initializer from the bitstream (the extracted syntax structure) may be similar to those defined in HEVC SCC to read any palette transmitted in the bitstream.

Once the palette predictor initializer has been fully determined, it is stored in memory and associated with the ID of the extracted syntax structure (i.e. the ID obtained at step 1202) at step 1206. This storing allows retrieving easily the palette predictor initializer when the ID is used once again later on.

FIG. 12b show the same decoding process as FIG. 5 in a simpler way, but adapted to the present invention.

Steps 1211 to 1217 are similar to conventional steps of the decoder. Steps 1220 and 1221 are specific to embodiments of the present invention.

In this decoding process, bitstream 1200 is parsed at step 1211 to obtain information about the current coding structure. This information may for instance define the nature of the current coding structure, for instance whether it is a frame, a slice, a tile, etc.; and the information may also specify which pixel block (CU or CTB) is the first block of the current coding structure. This is because the present invention is dedicated to initialization, i.e. to a process that is usually performed for the very first part of the considered coding structure.

In an HEVC-related embodiment, the pixel block considered is a CTB. This allows initializing the decoding loop for the current coding structure by selecting the first CU at step 1212. Next, the current CU is decoded at step 1213 possibly using palette predictor 1215 (to obtain the current palette) if the CU is encoded using the Palette coding mode.

In a particular embodiment relying on palette sharing (i.e. using the last used palette as the palette to be used for the next palette-encoded pixel block), the last used palette has been copied into the starting part of the palette predictor for the next pixel block (which palette predictor may also have received other entries). To signal the number of first entries (i.e. that come from the last used palette) of the palette predictor to copy to form the next palette and thus to facilitate their retrieval from the predictor, the palette predictor 1215 also holds information of the last used palette size, denoted N. Indeed, by simply copying the N first entries of the palette predictor into the next palette, the next palette in the palette sharing mode is fully built.

At step 1214, the palette predictor is updated if appropriate, for instance as explained above with reference to FIG. 10 or by copying each entry of the current palette in case of palette sharing. The decoding loop over all the CUs is obtained through steps 1216 and 1217.

According to the invention, the palette predictor 1215 is initialized using a palette predictor initializer, when starting encoding or decoding a new self-contained coding structure. To achieve this, when parsing (or writing when encoding) bitstream 1200, an identifier ID of a syntax structure associated with a coding structure of high hierarchical level is obtained at step 1220. This may happen by extracting information from bitstream 1220 before or after information 1211 is parsed, but before first CU 1212 is decoded.

This identifier ID allows retrieving the palette predictor initializer at step 1221, which has been previously stored using the identifier at step 1206 of FIG. 12a. This identifier may be a new syntax element. In one embodiment where the coding structure parsed is a slice and the palette predictor initializer is stored in a PPS, the already existing syntax element identifying the PPS for said slice plays this role.

In another embodiment where step 1221 happens at the start of every slice and the palette predictor initializer is associated with tiles (i.e. defined at the tile level), each slice may identify (using an ID) the tile to which it belongs. In this embodiment, step 1220 thus identifies to which tile the current slice belongs, and then retrieves the palette predictor initializer for the ID of the associated tile.

At the end of step 1221, the palette predictor initializer has been retrieved. It can be used once to initialize palette predictor 1215 just before the first CU of the current coding structure (e.g. slice) is decoded. This may be performed by setting the number of entries in the predictor from the number of entries of the initializer. These two sizes may not be equal, as a maximum size may be imposed (either from the SPS maximum predictor size or an arbitrary one). Then, the entries are copied from the palette predictor initializer to the palette predictor, according to the number of entries in the predictor that has just been set.

In a further embodiment, the size of the previous palette is 0, as no CU has been decoded. However, as the palette predictor initializer provides a palette, said size of the previous palette may be derived from the size of the palette predictor initializer, e.g. the minimum between the maximum palette size (cf. palette_max_size on FIG. 14a) and the palette initializer size. This further embodiment operates when a palette sharing is for instance implemented, i.e. when, through the processing of a coding structure, the next palette used to encode the next pixel block or CU reuses all the entries of the last palette used for the last palette-coded pixel block or CU.

The above explanation shows that the palette predictor initializer is defined at the level of a coding structure which has a hierarchical level strictly higher than the one of the slice (e.g. SPS, PPS, tile, etc.) and it is then associated at the level of the slice.

Turning now to algorithms at the encoder's end to determine such a palette predictor initializer, FIGS. 13a-13b illustrate an exemplary algorithm for initializer determination, which algorithm has benefits of coding efficiency, computation load control and low delay properties (i.e. the results are obtained for the current frame without impacting too much the encoder delay in outputting data).

This algorithm works by performing more or less fast encoding of a subset of the CTBs, preferably spread over an image area corresponding to the self-contained coding structure considered (e.g. slice). To achieve that fast encoding, different shortcuts can be enabled, for instance, early termination (e.g. in INTER or when there would be too many escape-coded pixels when testing Palette mode) or modifying thresholds causing further analysis (e.g. to investigate further partitioning for IBC). One of the palette predictors obtained at the end of the fast encoding on the subset of CTBs may be used as the palette predictor initializer which is transmitted in the bitstream.

FIG. 13a displays examples of such subsets of pixel blocks for the initializer determination.

Ideally, the CTBs are regularly spaced so as to be representative of the area (e.g. slice) as much as possible. Preferably the CTBs considered for the subset are not on an edge (left/top/bottom/right) of the area or image, as their content might be more easily encoded using other coding modes than the palette coding mode (e.g. hard edges of user interfaces are better encoded with INTRA angular prediction).

Also, the CTBs considered for the subset are preferably not horizontally or vertically aligned. Otherwise, they may belong to the same frame-wide structure.

In a first embodiment 1301 shown in the left part of the Figure, the pixel blocks of the subset are distributed along a slope or a diagonal of the area. In this example, the subset is made of the dark CTBs. This example follows all the properties mentioned above.

It is considered that this first exemplary subset 1301 is well suited to areas where only one palette predictor initializer must be determined for more than one slice.

In a first embodiment 1302 shown in the right part of the Figure, the pixel blocks of the subset are horizontally aligned on the top of the image area, preferably on the top of the image. This embodiment is better tailored for cases where the higher level structure (image or tile) contains a single self-contained coding structure, e.g. a single slice, and the palette predictor initializer thus obtained is better suited to encode the start of said higher level structure.

In particular, tailoring it for another part of the image would indicate a possibility to forcibly reset the palette predictor during the slice encoding. The benefits of the palette predictor initializer then stems from the fact that it will be used for several frames (and thus several slices).

Therefore, the CTBs forming the subset 1302 are rather concentrated at the start of the image, where the palette predictor is usually empty.

In that case, analysing CTBs that are far from the image start may result in palette predictor elements that will be flushed by the update mechanism 1214 of FIG. 12b.

In addition, selecting CTBs too close to each other may cause picking up only slightly different and rarely occurring colours. Preference is thus given to select pixel blocks that are not contiguous, for instant by defining a step between the CTBs considered that is equal to or larger than 1, as shown in 1302.

Based on the subset of CTBs, FIG. 13b illustrates, in a flowchart, general steps for determining a palette predictor initializer at the encoder's end.

The process starts at step 1311 by determining the block subset, taking into account the use of tiles, slices, and the area on which it is applied and so on.

In particular, as described with reference to FIG. 11, the image may be artificially split into areas, or split into conventional tiles or slices. In that case, the algorithm may be applied to each area, and then, when encoding the coding structures, e.g. slices, it is determined to which higher-level area the coding structure belongs (it may not completely belong to said area).

This approach makes it possible to obtain the starting and end points of the area based on which the subset blocks, such as examples 1301 and 1302, are defined.

Another parameter that can be taken into account when determining the subset is an allowed number of blocks or CTBs. For instance, the number of blocks in the subset may not be more than a predetermined number (e.g. 10) or a ratio of the considered area (e.g. 10%).

Next to step 1311, step 1312 provides that the encoder parameters are initialized. This may involve all the classical determinations (quantization matrices, quantizer steps, allowed coding modes, etc.). In particular, this may also involve setting fast analysis parameters, e.g. a reduced search for Intra Block Copy, the removal or speed-up of some coding modes (including the Palette coding mode), etc.

Next, at step 1313, the first block of the subset is selected.

At step 1314, the current block is encoded. As mentioned previously, the encoding process may be slightly modified by step 1312 to offer a reduced workload. This may also involve setting up specific encoding parameters for this block: for instance, there is no encoded pixel on the borders of the block, and intra prediction methods cannot operate for such boundary pixels, and is thus disabled during analysis for those pixels.

Furthermore, using a subset of CTBs may cause issues in the Intra Block Copy analysis. All of these can be addressed during step 1314.

At step 1315, the palette predictor generated for the current block is retrieved and saved for later reference.

Next, at step 1316, a test is performed to determine whether or not the analysis is complete.

This determination may be based on a time budget. If the time budget has been fully used, the analysis stops.

Also, referring to the possible flush of elements from the palette predictor at step 1214 of FIG. 12b, it could be interesting detecting such flush during analysis so to decide when stopping the analysis.

For instance, when considering exemplary subset 1302, it is highly interesting to stop the analysis quickly enough, as the new entries may actually rarely be used. For instance, said analysis may be stopped immediately when a flush is detected, or a flush counter may be decremented at each new element being flushed away, until the counter reaches 0 and indicates the end of the analysis.

In the case of exemplary subset 1301, this approach is less interesting, because the colours in the palette predictor initializer need to be defined for as many CTBs as possible. It is therefore interesting to keep the most frequently used (because it is believed that they will be useful for several slices).

In any case, if step 1316 determines that the analysis should be stopped, the algorithm ends at step 1319, which will be described later. Otherwise, step 1317 tests whether or not the last block of the subset has been processed. If it has been, step 1319 occurs to end the algorithm. Otherwise, the next block in the subset is selected at step 1318, and the analysis process loops back to step 1314.

In a particular embodiment, this encoding of the subset may be repeated, several times in order to obtain each time better palette predictors for the blocks, and thus to use the Palette coding mode more often: this repetition comprises recursively encoding the same subset of block of pixels, wherein the first palette predictor used for the next recursive encoding loop is the palette predictor obtained at the end of the previous recursive encoding loop.

At the end 1319 of the analysis, several operations are performed.

The main operation is to set the palette predictor initializer, encode it and transmit it in the bitstream.

This requires selecting one of the palette predictors for use as the palette predictor initializer. For instance, it may be the last palette predictor of the analysis.

Next, the selected palette predictor initializer may be controlled to determine whether or not it is actually good for encoding.

For instance, if there are two few entries (e.g. less than four) in it, this may indicate that there is mostly natural content in the area analyzed, in which case it is not worth using the Palette coding mode. This information may thus serve to deactivate the palette coding mode in regular encoding, until another analysis obtains a better result.

Another case is when the selected palette predictor is not different enough (e.g. is included) from the palette predictor initializer that is currently in use for the area, in which case the palette predictor initializer currently in use is kept instead of the newly determined one.

Another operation is to filter out the entries of the palette predictor selected in case they are useless, for instance based on a frequency criterion (e.g. some colours that occurred for only one block) or a similarity criterion (a colour is very similar to another in the palette predictor initializer).

Another embodiment is to derive the entries of the selected palette predictor once again, to be representative of the CTBs analyzed as much as possible. For instance, a more classical classification algorithm may take the palette entries found as a start point, and determine the actual centroid for each of the classes associated with said entries, using for instance a Kmeans algorithm.

FIGS. 14a-14b illustrate two embodiments for declaring or defining the palette predictor initializer, in particular within the SPS in FIG. 14a, and within the PPS in FIG. 14b. The two embodiments are quite similar; thus a single combined description is given below.

Both embodiments rely on an existing extension section of the PPS and SPS syntax structures in the HEVC standard and its SCC Extension (see document JCTVC-S1005). The presence of the corresponding extension sections (namely "sps_scc_extensions" and "pps_scc_extensions") is indicated in the SPS and PPS, by the flags sps_scc_extensions_flag and pps_scc_extensions_flag respectively.

In the two embodiments, relevant palette predictor initializer information is added to respectively the SPS SCC extension and the PPS SCC extension.

The syntax elements added to the existing extension section are shown in bold in FIGS. 14a and 14b. The name, location or type of information of these additional syntax elements are for illustrative purposes. Of course, other names can be used.

As mentioned above with reference to step 1204, the Palette coding mode can be deactivated. As a consequence, the invention parses the information relating to the palette mode only if the palette_mode_enabled_flag is right, or if equivalent information at the SPS or PPS level indicates that the Palette coding mode is activated.

Based on the example of the Figures, a first flag palette_predictor_initializer_present_flag may be used. It indicates whether the palette predictor initializer is present (i.e. actually defined in the SPS or PPS SCC extension).

If it is present, its size is known and is at least 1. Its maximum size is variable, but can be limited to be below a maximum size indicated in the SPS or PPS SCC extensions (see palette_max_predictor_size).

The VLC size minus 1 (VLC for variable length coding, for instance using standard-specified Exp-Golomb codes) is specified using a corresponding field: size_palette_predictor_initializer_minus1. It is the size of the palette predictor initializer.

Next, the values of the entries of the palette predictor initializer are defined. Although not depicted here, preference is given to use a byte-aligned coding to encode these values: this allows easier parsing of the SCC extension to be done. In an embodiment, they are coded as elements of fixed length, with N[comp] (see below) for the component comp of each entry.

To be noted that the number of components num_comp of the entries is known: information such as chroma_format_idc or separate_colour_plane_flag included in the SPS allows determining the number of components. Also, the number of bits N[comp] for each component is also known, as they can be derived from the syntax elements bit_depth_luma_minus8 and bit_depth_chroma_minus8 included in the SPS.

Last, FIG. 14c illustrates a way to provide a list of palette predictor initializers, for use when components are encoded separately, or that tiles are used. A case where components are not jointly coded is 4:2:0 color format, where a palette may be defined for luma (one single component) and another for chroma (two components).

Another case where such a list is needed is when there is a number N of tiles, and the association 1221 between the slice and the palette prediction initializer is made through the tile to which the slice belongs.

In each case, the list can be determined by information belonging to either SPS or PPS. So the syntax structure loops over each set of the list of initializers, of size num_sets. For each set, the different information already presented, such as
> palette_predictor_initializer_present_flag[set], and
> size_palette_predictor_initializer minus1[set],
> are sent.

Then, the number of components num_comps[set] for said initializer and the list comp_list[set] of components allows determining the components to use and how to read the values of the palette predictor initializer for each set.

In the case of tile, this is just the regular list of components. In case of a specific color format, this allows specifying a palette predictor initializer per set of independent components.

In another embodiment, the syntax used by the invention is advantageously decoupled from other information coming from e.g. the SPS. This allows separate handling by a decoder and easier setup schemes in a video streaming scenario for example. In such case, it may be important to provide information that is duplicated, e.g. if, as illustrated, the palette predictor initializer is transmitted in a PPS, then this PPS may duplicate information from the SPS, while requiring that said information has the same meaning. This embodiment is illustrated in FIG. 14d. Some parts of FIG. 14d are common to some parts of FIG. 14c. The supplementary information comprises a first flag monochrome_entries_flag or an equivalent parameter, allowing to deduce the number of components. Another embodiment is to repeat chroma_format_idc and/or separate_colour_plane_flag, or derived information thereof. This information shall match what is transmitted at any other level such as the SPS, so that the number of components that is inferred from this information correspond to the number of components of the image that refers the pps_scc_extensions and its PPS. One can further put that requirement on the bitstream and its conformance to specifications of a standard using an embodiment of the invention.

When the number of components is known, further information can be obtained. In particular the bitdepths of the components can be transmitted. It is typical to transmit separately luma and chroma bitdepths, which is the case with luma_bit_depth_entries_minus8 and chroma_bit_depth_entries_minus8. Indeed, the signal has 8 or more bits of depth, so only transmitting the number of additional bits over 8 is what is typically signaled. One important consideration is that those values ideally match the actual bitdepths of the image that refers the PPS, e.g. $BitDepth_Y$ and $BitDepth_C$, as found in the HEVC specifications, and can be considered a further requirement on the conformance of the bitstream. As we transmitted information allowing deducing the number of components, parsing of chroma_bit_depth_entries_minus8 may be made conditional.

When all information required to read the palette predictor initializer entries are known, the reading of entries, as already explained in previous FIG. 14a to FIG. 14c can occur. This is conditioned by the value of monochrome_entries_flag or equivalent syntax information. A typical embodiment is to either read one or three components per palette predictor initializer entry, as depicted on FIG. 14d.

Conversely, the retrieved palette predictor initializer on step 1221 also contains the number of components and the required storage per entry, thereby clearly determining how to copy said initializer to the actual palette predictor in step 1215.

Conventional mechanisms to extract the entries of the initializer from the SPS or PPS SCC extensions can be used.

Several ways to initialize a palette predictor (FIGS. 12a-12b) on the decoder side have been described, as well as how to find the palette predictor initializer on the encoder side (FIGS. 13a-13b) and how to embed it in the bitstream (FIGS. 14a-14d). In a preferred embodiment, the palette predictor initializer is stored in a PPS, and the block structure is the slice.

First experimentations of the invention by the inventors have shown a 1.8% gain in coding. However, it is believed that better gains may be obtained depending on encoding parameters and on the image content to encode.

FIG. 15 illustrates an existing process for declaring or defining the palette predictor initializer within the standard specification as described in JCTVC-T1005. This embodiment relies on an existing extension section of the PPS syntax structure in the HEVC standard and its SCC Extension (see document JCTVC-T1005). The presence of the corresponding extension section (namely "pps_scc_extensions") is indicated in the PPS, by the flag pps_scc_extensions_flag.

It firstly contains information relating to the "residual adaptive colour transform" tool (referred to as "ACT" from now on), which applies a revertible predetermined colour transform to the decoded output block. This tool can be disabled at the PPS level by setting the flag residual_adaptive_colour_transform_enabled_flag to 0.

If it is not disabled, then addition information follows. A flag pps_slice_act_qp_offsets_present_flag indicates whether quantiser step offsets (compared to the ones set for the slice that uses current PPS) are present, in which case these offsets, pps_act_y_qp_offset_plus5, pps_act_cb_qp_offset_plus5, and pps_act_cr_qp_offset_plus3 are transmitted as variable-length elements.

Then a first flag related to the palette mode palette_predictor_initializer_present_flag is used. It indicates whether the palette predictor initializer is present (i.e. actually defined in the PPS SCC extension as mentioned above).

If it is present, then information regarding the entries of this initializer are transmitted. Firstly, the colour format information. It is usually a three components or a monochrome format. A flag monochrome_palette_flag indicates if the format comprises only one color component if set to a predetermined value, for example 1. If not set to this value, the format is not monochrome.

Then, the bitdepth of the first (and potentially only) component is transmitted on a variable number of bits by the syntax element luma_bit_depth_entry_minus8. As the bitdepth of any component cannot be lower than 8, only the difference of said bitdepth with 8 needs to be transmitted (thereby saving a few bits). Then, if the entries are not monochrome, the bitdepth for chroma is transmitted through the syntax element chroma_bit_depth_entry_minus8.

Then, as it is known palette entries are transmitted, their number is known, and is at least 1. Its value is transmitted through the variable-length syntax element: num_palette_predictor_initializer_minus1. It is the size of the palette predictor initializer.

Next, the values of the entries of the palette predictor initializer are defined. To be noted that the number of components numComps of the entries is known and is 1 when monochrome_palette_flag is 1 and 3 otherwise. Also, the number of bits for each component is also known, as they can be derived from the syntax elements luma_bit_depth_entry_minus8 and chroma_bit_depth_entry_minus8 included in the SPS.

The proposed syntax is redundant and may even be source of faults. By authorizing contradictory configurations, the current syntax is not efficient enough.

As proposed below, the information in the PPS extension can be improved regarding the use of the palette mode. FIG. 16 illustrates an example of such an improvement.

According to an embodiment, a parameter like a flag called here "monochrome_flag" is sent before either the palette or ACT tool information is transmitted. In other words, the proposed "monochrome_flag" is defined at the PPS level. As a variant, the monochrome flag may be defined at a sequence level. If the monochrome_flag is set to a predetermined value, for example "1", then when considering the palette predictor initializer, the palette entries are directly adjusted for a monochrome format (in other words that the step for defining the palette predictor initializer is amended given the palette predictor initializer comprises only one element per entry). There is no more need of a parameter, specific to the palette predictor initializer, for signalling the colour format in order to adapt the number of entries. The invention according to one of its aspect, proposes to use a parameter defined at the picture (or image) level of at a higher level.

In a preferred embodiment, when the "monochrome_flag" is set to "1", then the ACT tool is disabled (in other words the step of reading the value of the "residual_adaptive_coulour_transform_enabled_flag" is skipped, disabling the ACT tool), given that tool become useless. In that case the flag residual_adaptive_colour_transform_enabled_flag is inferred to be 0. On the opposite, if monochrome_flag's value is 0, then the ACT tool may or may not be enabled, therefore its corresponding flag is transmitted. Similarly, the palette entries number of components numComps is 3.

According to another embodiment, a simpler syntax is proposed so that the monochrome_flag impacts only one mode at a time, preferably the palette mode. Such an example would be in case the palette mode is known to be deactivated by another mean.

An example of such an embodiment is illustrated in FIG. 17. In that case, a condition (for example a single condition) is introduced before reading flag monochrome_palette_flag presented in FIG. 10. If the ACT tool is activated (as indicated by the value of its corresponding flag residual_adaptive_colour_transform_enabled_flag), then the pixel colour format is deduced as being not monochrome: there are three color-components. The flag monochrome_palette_flag's value can be directly inferred to be "0". On the contrary, if the ACT tool is disabled, the format may or may not be monochrome.

In another embodiment it is proposed an encoder-only constraint, so as to not modify the decoder logic. The two following conditions must be satisfied: if residual_adaptive_colour_transform_enabled_flag is 1, then monochrome_palette_flag must be 0. And if monochrome_palette_flag is 1, residual_adaptive_colour_transform_enabled_flag must be 0.

In another embodiment it is proposed to decorrelate the actual pixel format from the number of components of the entries. In the previous embodiment, the palette predictor initializer is set to have entries having a different number of components according to the pixel format. In this embodiment the same palette predictor initializer may be able to be used with monochrome data and RGB or YUV data. As a consequence, both palette predictor and palette predictor initializer may have entries with one to three elements depending on the color format. The number of elements per entry may be different for the palette predictor and palette predictor initializer. In such case, when initializing the palette predictor with the predictor initializer, various rules may be applied. For instance, when going from one component to three, the palette predictor entries predictor[i] are initialized with default greyscale values or existing palette predictor initializer entries. For instance, For RGB, predictor[i][2], predictor[i][1] and predictor[i][0] are set equal to palette_predictor_initializers[i][0];

For YUV, predictor[i][0] is set equal to palette_predictor_initializers[i][0], and predictor[i][2] and predictor[i][1] are set equal to a specific value of the component (i.e. 0, 128 or 255 for a component whose values are between 0 and 255).

Other variations as possible, i.e. when going from three to one component, when coding a given color plane for a component of index comp (for instance U if YUV format is considered), predictor[i] is set to palette_predictor_initializers[i][comp]. Conventional mechanisms to extract the entries of the initializer from the PPS SCC extension can be used. Several ways to define a simplified syntax removing redundancy between the palette mode and other existing tools on the decoder side have been described.

FIG. 18 is a schematic block diagram of a computing device 1800 for implementation of one or more embodiments of the invention. The computing device 1800 may be a device such as a micro-computer, a workstation or a light portable device. The computing device 1800 comprises a communication bus connected to:

- a central processing unit 1801, such as a microprocessor, denoted CPU;
- a random access memory 1802, denoted RAM, for storing the executable code of the method of embodiments of the invention as well as the registers adapted to record variables and parameters necessary for implementing the method for encoding or decoding an image according to embodiments of the invention, the memory capacity thereof can be expanded by an optional RAM connected to an expansion port for example;
- a read only memory 1803, denoted ROM, for storing computer programs for implementing embodiments of the invention;
- a network interface 1804 is typically connected to a communication network over which digital data to be processed are transmitted or received. The network interface 1804 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 1801;
- a user interface 1805 may be used for receiving inputs from a user or to display information to a user;
- a hard disk 1806 denoted HD may be provided as a mass storage device;
- an I/O module 1807 may be used for receiving/sending data from/to external devices such as a video source or display.

The executable code may be stored either in read only memory 1803, on the hard disk 1806 or on a removable digital medium such as for example a disk. According to a variant, the executable code of the programs can be received by means of a communication network, via the network interface 1804, in order to be stored in one of the storage means of the communication device 1800, such as the hard disk 1806, before being executed.

The central processing unit 1801 is adapted to control and direct the execution of the instructions or portions of software code of the program or programs according to embodiments of the invention, which instructions are stored in one of the aforementioned storage means. After powering on, the CPU 1801 is capable of executing instructions from main RAM memory 1802 relating to a software application after those instructions have been loaded from the program ROM 1803 or the hard-disk (HD) 1806 for example. Such a software application, when executed by the CPU 1801, causes the steps of the flowcharts shown in FIGS. 13a-13b, 14a-14d, 16 and 17 to be performed.

Any step of the algorithms shown in FIGS. 13a-13b, 14a-14d, 16 and 17 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of decoding at least one image from a bitstream, the image being split into hierarchical coding structures including at least one slice, the method comprising:
    decoding encoded data of the slice, using a palette coding mode, the palette coding mode using, for each of processed pixel blocks of the slice, an associated palette that comprises a set of entries associating respective entry indexes with corresponding pixel values, wherein the palette associated with each processed pixel block is predicted from a palette predictor using prediction information from the bitstream;
    obtaining, from the bitstream, information about a number of color components and a palette predictor initializer associated with a coding structure hierarchically above the slice, entries of the palette predictor initializer being obtainable using said information about the number of color components; and
    initializing the palette predictor for the slice using the obtained palette predictor initializer, wherein:
    the palette predictor initializer is obtained using information indicating whether the palette coding mode is activated or not, and information indicative of a size of the palette predictor initializer, said information being included in a Sequence Parameter Set, SPS; and
    each palette predictor subsequent to the initialized palette is built from a current palette associated with a block currently being decoded and the palette predictor used for predicting the current palette.

2. A method of encoding at least one image into a bitstream, comprising:
    obtaining hierarchical coding structures by splitting the image;
    encoding data of the coding structures of the image to obtain an encoded slice, wherein said encoding uses a palette coding mode, the palette coding mode using, for each of block of pixels of the slice, an associated palette that comprises a set of entries associating respective entry indexes with corresponding pixel values, wherein the encoding includes determining prediction information predicting the palette associated with each processed pixel block from a palette predictor;
    obtaining information about a number of color components;
    determining a palette predictor initializer to initialize the palette predictor for the slice, entries of the palette predictor initializer being obtainable using said information about the number of color components;
    in the bitstream, providing the encoded data including the prediction information and providing said information about the number of components and the palette predictor initializer, wherein the palette predictor initializer is associated with a coding structure hierarchically above the slice in the bitstream, and
    wherein:
    information indicating whether the palette coding mode is activated or not, and information indicative of a size of the palette predictor initializer are included in a Sequence Parameter Set, SPS; and
    in the palette coding mode, each palette predictor subsequent to the initialized palette predictor is built from a current palette associated with a block currently being encoded and the palette predictor for predicting the current palette.

3. The method of claim 1, wherein the palette predictor initializer is defined at a sequence level in the Sequence Parameter Set, SPS; and the slice makes reference to the Sequence Parameter Set.

4. The method of claim 3, wherein the palette predictor initializer is defined after a field indicating whether the palette coding mode is activated or not and after one or more other fields for information indicative of a maximum size for the palette predictor, in the Sequence Parameter Set.

5. The method of claim 1, wherein the initializing for the slice is performed before decoding the very first block of pixels in the slice.

6. The method of claim 1, wherein building each palette predictor subsequent to the initialized palette predictor from a current palette and the palette predictor for predicting the current palette comprises including all the entries of a current palette associated with a block currently being encoded and entries of the palette predictor for predicting the current palette which are not used to predict the current palette in the palette predictor to be built.

7. The method of claim 1, wherein the prediction information to predict the palette from the palette predictor includes flags, each flag of which defining whether or not a corresponding entry in the palette predictor is selected as an entry to generate an entry in the palette.

8. The method of claim 2, wherein determining the predictor initializer comprises encoding, using the palette coding mode, a subset of blocks of pixels spread over an image area defined by said coding structure hierarchically above the slice, and comprises using a palette predictor obtained at the end of the encoding, as the palette predictor initializer.

9. The method of claim 8, wherein the blocks of pixels of the subset are distributed along a slope or a diagonal of the area.

10. The method of claim 8, wherein the blocks of pixels of the subset are horizontally aligned on the top of the image.

11. The method of claim 10, wherein the blocks of pixels of the subset are not contiguous.

12. The method of claim 8, wherein determining a palette predictor initializer comprises recursively encoding the same subset of block of pixels, wherein the first palette predictor used for the next recursive encoding loop is the palette predictor obtained at the end of the previous recursive encoding loop.

13. The method of claim 1, wherein two or more images are split into hierarchical coding structures including a plurality of slices, said slices each having a same hierarchical level in the image, and the encoded data of the slices are related to at least two distinct images.

14. The method of claim 1, wherein the image is split into hierarchical coding structures including a plurality of slices, said slices each having a same hierarchical level in the image, and the slices are included in the same image.

15. The method of claim 1, wherein a size of the palette is set using a size of the palette predictor initializer used to initialize the palette predictor.

16. The method of claim 1, wherein said information is a flag for signalling whether said image is a monochrome image or not.

17. A decoding device for decoding at least one image from a bitstream, the image being split into hierarchical coding structures including at least one slice, the decoding device comprising:
  a decoder configured to decode encoded data of the slice, using a palette coding mode, the palette coding mode using, for each of processed pixel blocks of the slice, an associated palette that comprises a set of entries associating respective entry indexes with corresponding pixel values, wherein the palette associated with each processed pixel block is predicted from a palette predictor using prediction information from the bitstream;
  an obtaining unit configured to obtain, from the bitstream, information about a number of color components and a palette predictor initializer associated with a coding structure hierarchically above the slice, entries of the palette predictor initializer being obtainable using said information about the number of color components; and
  an initializer configured to initialize the palette predictor for the slice using the obtained palette predictor initializer,
  wherein:
  the palette predictor initializer is obtained using information indicating whether the palette coding mode is activated or not, and information indicative of a size of the palette predictor initializer, said information being included in a Sequence Parameter Set, SPS; and
  in the palette coding mode, each palette predictor subsequent to the initialized palette predictor is built from a current palette associated with a block currently being decoded and the palette predictor for predicting the current palette.

18. An encoding device for encoding at least one image into a bitstream, the encoding device comprising:
  an obtaining unit configured to obtain hierarchical coding structures by splitting the image; and
  an encoder configured to:
    encode data of the coding structures of the image to obtain a slice, wherein said encoding uses a palette coding mode, the palette coding mode using, for each block of pixels of the slice, an associated palette that comprises a set of entries associating respective entry indexes with corresponding pixel values, wherein said encoding includes determining prediction information predicting the palette associated with each processed pixel block from a palette predictor;
    obtain information about a number of color components;
    determine a palette predictor initializer to initialize the palette predictor for the slice, entries of the palette predictor initializer being obtainable using said information about the number of color components;
    in the bitstream, provide the encoded data including the prediction information and provide said information about the number of color components and the palette predictor initializer, wherein the palette predictor initializer is associated with a coding structure hierarchically above the slice in the bitstream; and
  wherein:
  information indicating whether the palette coding mode is activated or not, and information indicative of a size of the palette predictor initializer are included in a Sequence Parameter Set, SPS; and
  in the palette coding mode, each palette predictor subsequent to the initialized palette predictor is built from a current palette associated with a block currently being encoded and the palette predictor for predicting the current palette.

19. A non-transitory computer-readable medium storing a program which, when executed, causes a computer to execute a process of decoding at least one image from a bitstream, the image being split into hierarchical coding structures including at least one slice, the process comprising:
  decoding encoded data of the slice, using a palette coding mode, the palette coding mode using, for each of processed pixel blocks of the slice, an associated palette that comprises a set of entries associating respective entry indexes with corresponding pixel values, wherein the palette associated with each processed pixel block is predicted from a palette predictor using prediction information from the bitstream;
  obtaining, from the bitstream, information about a number of color components and a palette predictor initializer associated with a coding structure hierarchically above the slice, entries of the palette predictor initializer being obtainable using said information about the number of color components; and
  initializing the palette predictor for the slice using the obtained palette predictor initializer, wherein:
  the palette predictor initializer is obtained using information indicating whether the palette coding mode is activated or not, and information indicative of a size of the palette predictor initializer, said information being included in a Sequence Parameter Set, SPS; and
  each palette predictor subsequent to the initialized palette is built from a current palette associated with a block currently being decoded and the palette predictor using for predicting the current palette.

20. A non-transitory computer-readable medium storing a program which, when executed, causes a computer to execute a process of encoding at least one image into a bitstream, the process comprising:

obtaining hierarchical coding structures by splitting the image;

encoding data of the coding structures of the image to obtain an encoded slice, wherein said encoding uses a palette coding mode, the palette coding mode using, for each of block of pixels of the slice, an associated palette that comprises a set of entries associating respective entry indexes with corresponding pixel values, wherein the encoding includes determining prediction information predicting the palette associated with each processed pixel block from a palette predictor;

obtaining information about a number of color components;

determining a palette predictor initializer to initialize the palette predictor for the slice, entries of the palette predictor initializer being obtainable using said information about the number of color components;

in the bitstream, providing the encoded data including the prediction information and providing said information about the number of components and the palette predictor initializer, wherein the palette predictor initializer is associated with a coding structure hierarchically above the slice in the bitstream, and wherein:

information indicating whether the palette coding mode is activated or not, and information indicative of a size of the palette predictor initializer are included in a Sequence Parameter Set, SPS; and in the palette coding mode, each palette predictor subsequent to the initialized palette predictor is built from a current palette predictor associated with a block currently being encoded and the palette predictor for predicting the current palette.

* * * * *